United States Patent [19]

Fujita

[11] Patent Number: 5,717,663
[45] Date of Patent: Feb. 10, 1998

[54] INFORMATION DATA RECORDING AND REPRODUCTION APPARATUS

[75] Inventor: Hiroyuki Fujita, Kanagawa, Japan

[73] Assignee: Sony Corportion, Tokyo, Japan

[21] Appl. No.: 759,429

[22] Filed: Dec. 5, 1996

[30] Foreign Application Priority Data

Dec. 8, 1995 [JP] Japan ................................. 7-320187
Dec. 15, 1995 [JP] Japan ................................. 7-327126

[51] Int. Cl.$^6$ ................................................ G11B 7/00
[52] U.S. Cl. ................................................ 369/32
[58] Field of Search ........................... 369/32, 48, 58, 369/54

[56] References Cited

U.S. PATENT DOCUMENTS

| | | | |
|---|---|---|---|
| 4,901,301 | 2/1990 | Senshu | 369/54 |
| 5,323,367 | 6/1994 | Tamura | 369/32 |
| 5,561,650 | 10/1996 | Yamagishi | 369/48 |

*Primary Examiner*—Nabil Hindi
*Attorney, Agent, or Firm*—William S. Frommer; Alvin Sinderbrand

[57] ABSTRACT

An information data recording and reproduction apparatus comprising a recording and reproducing means for recording and reproducing information data with respect to a designated recording region of a randomly accessible recording medium, a recording region managing means for managing occupied recording regions occupied by the recorded information data in the recording medium and empty recording regions of the recording medium, and a plurality of input/output control means respectively bus-connected to the recording region managing means via a first bus for receiving data indicating the occupied recording regions and the empty recording regions via the first bus and respectively bus-connected to the recording and reproducing means via a second bus for inputting and outputting the information data via the second bus, and each of the plurality of input/output control means designates regions of the recording medium to record the information data and regions of the recording medium recording the information data to reproduce to the recording and reproducing means based on the data indicating the occupied recording regions and the empty recording regions received from the record region managing means.

8 Claims, 32 Drawing Sheets

34

FILE    RECORD
ENTRY   ENTRY

FILE    RECORD  RECORD
ENTRY   ENTRY   ENTRY

FREE SPACE LIST

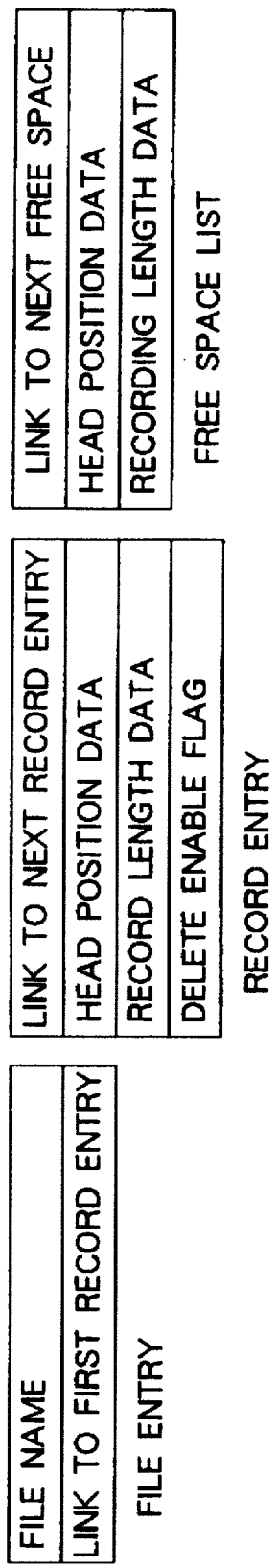

FIG. 14

| FILE NAME 1 | REPRODUCTION START POSITION | REPRODUCTION ENDING POSITION |
|---|---|---|
| FILE NAME 2 | REPRODUCTION START POSITION | REPRODUCTION ENDING POSITION |
| FILE NAME 3 | REPRODUCTION START POSITION | REPRODUCTION ENDING POSITION |
| ⋮ | ⋮ | ⋮ |

FIG. 15

| FILE NAME | REPRODUCTION START POSITION | REPRODUCTION ENDING POSITION | |
|---|---|---|---|
| FILE_A | 10 | 50 | (AUDIO AND/OR VIDEO DATA A) |
| FILE_B | 20 | 25 | (AUDIO AND/OR VIDEO DATA B) |
| FILE_C | 30 | 70 | (AUDIO AND/OR VIDEO DATA C) |
| FILE_D | 20 | 25 | (AUDIO AND/OR VIDEO DATA D) |

FIG. 16

| FILE NAME | STARTING BLOCK | ENDING BLOCK |
|---|---|---|
| PARTIAL DATA_A | 110 | 149 |
| PARTIAL DATA_B | 220 | 224 |
| PARTIAL DATA_C | 330 | 369 |
| PARTIAL DATA_D | 420 | 424 |

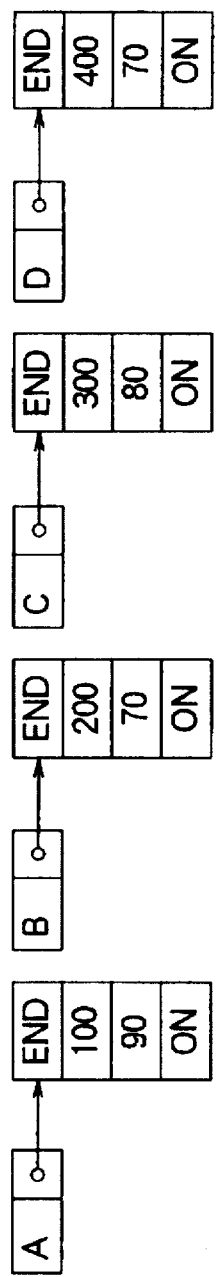
FIG. 17A
| FILE NAME | REPRODUCTION START POSITION | REPRODUCTION ENDING POSITION |
|---|---|---|
| A | 10 | 50 |
| B | 20 | 25 |
| C | 30 | 70 |
| D | 20 | 25 |
EXAMPLE OF PSEUDO DATA FILE
FIG. 17B
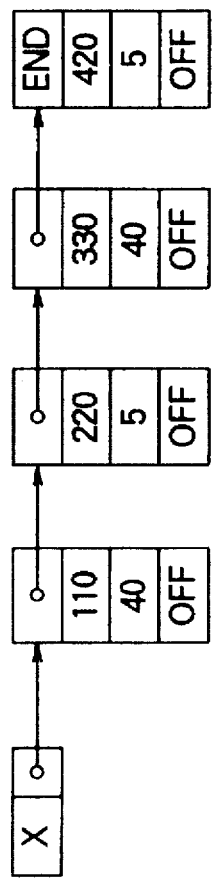
FIG. 17C

FIG. 19A
| FILE NAME | REPRODUCTION START POSITION | REPRODUCTION ENDING POSITION |
|---|---|---|
| FILE (1) | START (1) | END (1) |
| FILE (2) | START (2) | END (2) |
| ⋮ | ⋮ | ⋮ |
| FILE (n) | START (n) | END (n) |
| ⋮ | ⋮ | ⋮ |
| FILE (N) | START (N) | END (N) |
FIG. 19B
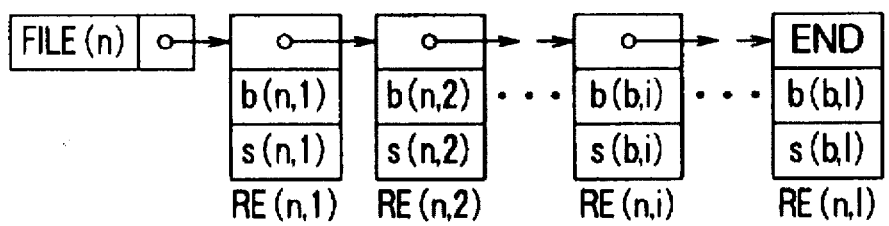
FIG. 19C
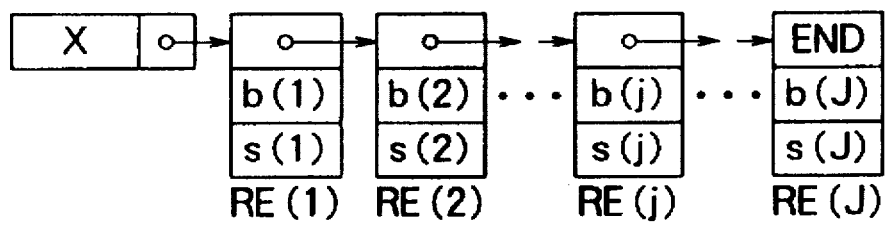

INFORMATION DATA RECORDING AND REPRODUCTION APPARATUS

BACKGROUND OF THE INVENTION

1. Field of the Invention

The present invention relates to an information data recording and reproduction apparatus for recording the information data supplied from a plurality of external apparatuses such as editing apparatuses and reproducing the recorded information data in accordance with the request from the external apparatus.

2. Description of the Related Art

In recent years, a hard disc array comprised of a large number of large capacity hard disc devices connected together, having a recording capacity of several tens to several hundreds of gigabytes (GB) as a whole, and able to be randomly accessed has been put into practical use.

This hard disc array is suitable for the recording of very large amounts of information data such as audio data and video data or one of the same (audio and/or video data) and is particularly excellent as a recording and reproduction apparatus for an editing apparatus due to the characteristic that it can reproduce any information data (such as audio and/or video data) with a short access time.

However, when the edited information data is recorded again in the hard disc array in which the information data covered by the editing (raw data) is recorded, information data having the same content will be recorded in an overlapping manner, the recording capacity of the hard disc array will be wasted, and there is a possibility that it editing of information data such as audio and/or video data spanning a long period of time will become impossible.

SUMMARY OF THE INVENTION

An object of the present invention is to provide an information data recording and reproduction apparatus which records a plurality of information data such as audio and/or video data to be edited in a randomly accessible recording medium such as a hard disc and magnetic optical disc (MO disc), reproduces any information data in accordance with the request of an external apparatus such as an editing apparatus, and provides the same.

Another object of the present invention is to provide an information data recording and reproduction apparatus suitable for editing of audio and/or video data spanning a long period of time.

Further, another object of the present invention is to provide an information data recording and reproduction apparatus which can reproduce information data having exactly the same content as that of the information data of the result of editing (edited data) without recording the information data having the same content in the recording medium in an overlapping manner.

Further, still another object of the present invention is to provide an information data recording and reproduction apparatus in which the load of processing regarded as indispensable in the information data recording and reproduction apparatus such as the management of the recording regions (occupied recording regions) occupied by the information data in the recording medium and the empty recording regions, processing regarding the input/output control signals input from external information apparatuses, and the protocol control regarding the input/output of the information data with the information apparatuses is dispersed to different component parts.

Further, still another object of the present invention is to provide an information data recording and reproduction apparatus in which the processing load is prevented from being concentrated to a specific component part and with which the information data can be input and output at a high speed with respect to a larger number of outside information apparatuses.

Further, another object of the present invention is to provide an information data recording and reproduction apparatus in which a bus for transmitting and receiving the information data and a bus for transmitting and receiving the other control data are separated and bottlenecks hardly ever occur in the bus.

In order to achieve the above objects, there is provided an information data recording and reproduction apparatus comprising a recording and reproducing means for recording and reproducing information data with respect to a designated recording region of a randomly accessible recording medium; a recording region managing means for managing occupied recording regions occupied by the recorded information data in the recording medium and empty recording regions of the recording medium; and a plurality of input/output control means respectively bus-connected to the recording region managing means via a first bus for receiving data indicating the occupied recording regions and the empty recording regions via the first bus and respectively bus-connected to the recording and reproducing means via a second bus for inputting and outputting the information data via the second bus, wherein each of the plurality of input/output control means designates regions of the recording medium to record the information data and regions of the recording medium recording the information data to reproduce to the recording and reproducing means based on the data indicating the occupied recording regions and the empty recording regions received from the record region managing means.

Preferably, the recording region managing means comprises an occupied recording region list generating means for generating an occupied recording region list of a linked list format linking each to each of a plurality of the occupied recording regions of the information data recorded in the recording medium by the recording and reproducing means, an identification flag adding means for adding an identification flag taking a first value to the occupied recording region list where the information data corresponding to the occupied recording region list can be deleted, a recording region releasing means for releasing the occupied recording regions requested to be released and deleting the released occupied recording regions from the occupied recording region list only in a case where the value of the identification flag is the first value when receiving the request for releasing the occupied recording regions, and an empty recording region list generating means for generating an empty recording region list of a linked list format linking each to each of a plurality of the empty recording regions of the recording and reproducing means.

Further, in order to achieve the above objects, the present invention provides an information data recording and reproduction apparatus comprising a recording and reproducing means for recording and reproducing information data with respect to a designated recording region of a randomly accessible recording medium; a first recording region managing means for managing first occupied recording regions occupied by the recorded information data in the recording medium and empty recording regions of the recording medium; a second recording region managing means for managing second occupied recording regions occupied by part or all of the information data as partial data to be reproduced in combination in the recording medium; and a plurality of input/output control means respectively bus-connected to the first recording region managing means and the second recording region managing means via a first bus for receiving the data indicating the first occupied recording regions, the data indicating the second occupied recording regions, and the empty recording regions via the first bus and respectively bus-connected to the recording and reproducing means via a second bus for inputting and outputting the information data via the second bus, wherein each of the plurality of input/output control means has a recording and reproducing control means for designating regions of the recording medium to record the information data to the recording and reproducing means based on the data indicating the empty recording regions of the recording medium receiving from the first recording region managing means and designating regions of the recording medium recording the information data to be reproduced to the recording and reproducing means based on the data indicating the first occupied recording regions and the second occupied recording regions received from the first recording region managing means and the second recording region managing means.

Preferably, the first recording region managing means comprises a first occupied recording region list generating means for generating a first occupied recording region list of a linked list format linking each to each of a plurality of the first occupied recording regions of the information data recorded in the recording medium by the recording and reproducing means, a first identification flag adding means for adding an identification flag taking a first value to the first occupied recording region list where the information data corresponding to the first occupied recording region list can be deleted, and an empty recording region list generating means for generating an empty recording region list of a linked list format linking each to each of a plurality of the empty recording regions of the recording and reproducing means, and the second recording regions managing means comprises a second occupied recording region list generating means for generating a second occupied recording region list of a linked list format linking each to each of the second occupied recording regions of the partial data to be reproduced in combination and a second identification flag adding means for adding an identification flag taking a second value to the second occupied recording region list where the information data corresponding to the second occupied recording region list cannot be deleted.

Further preferably, an information data recording and reproduction apparatus of the present invention further comprises a recording region releasing means for releasing the first occupied recording regions or the second occupied recording regions requested to be released and deleting the released first occupied recording regions or the released second occupied recording regions from the first occupied recording region list or the second occupied recording region list only in a case where the value of the identification flag is the first value when receiving the request for releasing the first occupied recording regions or the second occupied recording regions, and an empty recording region list generating means for generating an empty recording region list of a linked list format linking each to each of a plurality of the empty recording regions of the recording and reproducing means.

Further preferably, an information data recording and reproduction apparatus of the present invention further comprises a partial data recording means for continuously recording short partial data having a data length not more than a predetermined data length and a predetermined part of the partial data reproduced before or after the short partial data in the predetermined recording region of the recording medium where the partial data has a data length not more than the predetermined data length and a third recording region managing means for managing third occupied recording regions indicating recording regions occupied by the partial data, the predetermined part of the unit data recorded in the predetermined recording region of the recording region, and the short partial data in the recording medium based on the first occupied recording regions, wherein the recording and reproduction control means designates the first occupied recording regions, the second occupied recording regions, and the third occupied recording regions of the information data to be reproduced to the recording and reproducing means.

BRIEF DESCRIPTION OF THE DRAWINGS

These and other objects and features of the present invention will become more apparent from the following description of the preferred embodiments given with reference to the attached drawings, wherein

FIG. 7A to FIG. 7C are views illustrating the content of the recording region data generated by the data managing device shown in FIG. 4;

FIG. 14 is a view of the content of the editing data output to the input/output control device of the audio and/or video data recording and reproduction apparatus for reproducing the audio and/or video data having the same content as that of the edited data shown in FIG. 13B by the audio and/or video apparatus shown in FIG. 2 in the third embodiment;

FIG. 15 is a view of an example of the editing data in the third embodiment;

FIG. 16 is a view of an example of the editing data in the third embodiment;

FIG. 17A to FIG. 17C are views illustrating the file entry and record entry of the audio and/or video data (raw data) A to D shown in FIG. 13A in the fourth embodiment, the editing data used for reproducing the edited data shown in FIG. 13B and the reproduction entry generated by the processing of the data managing device;

FIG. 19A to FIG. 19C are views of the editing data regarding the generation the reproduction entry, the file entry, and the record entry and the reproduction entry obtained as the result of the generation of the reproduction entry;

DESCRIPTION OF THE PREFERRED EMBODIMENTS

Before describing the preferred embodiments of the present invention, the related art and the disadvantages therein will be described with reference to the accompanying figures.

Figure 1:
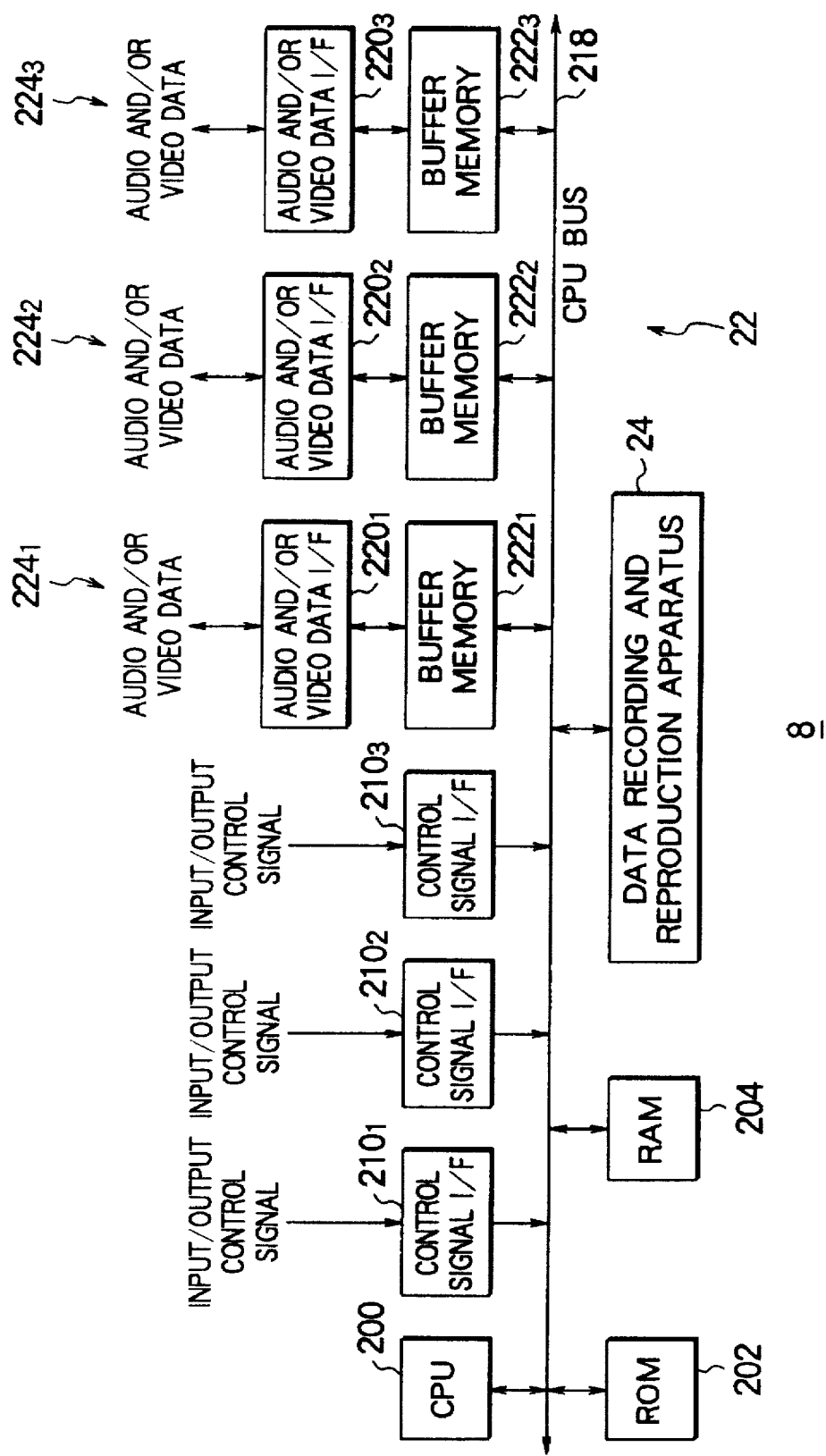
FIG. 1 is a view of an example of the configuration of a conventional audio and/or video data recording and reproduction apparatus.

FIG. 1 is a view of an example of the configuration of a conventional audio and/or video data recording and reproduction apparatus 8.

The conventional audio and/or video data recording and reproduction apparatus 8 is configured, for example, as shown in FIG. 1, by a recording and reproduction apparatus 24 which records and reproduces the audio and/or video data with respect to a randomly accessible recording medium (not illustrated) such as a hard disc array or a magnetic optical disc (MO) device, a microprocessor (CPU) for executing a control program stored in a ROM 202 by using a RAM 204, control signal interface circuits (control data IF) $210_1$ to $210_n$ (n=3 in FIG. 1), and input/output control circuits $224_1$ to $224_n$ respectively constituted by video audio signal interface circuits (audio and/or video data IFs) $220_1$ to $220_n$ and buffer memories $222_1$ to $222_n$ connected to each other via a CPU bus.

In the audio and/or video data recording and reproduction apparatus 8, the microprocessor 200 manages the recording regions (occupied recording regions) occupied by each of the series of audio and/or video data (audio data and video data or one of the same) recorded in the recording and reproduction apparatus 24 in the recording medium and the empty recording regions. The occupied recording region data and the empty recording region data (these will be also simply referred to as recording region data together) respectively indicating the occupied recording regions and the empty recording regions are stored in the RAM 204 and further recorded in a predetermined recording region of the recording medium of the recording and reproduction apparatus 24.

Further, the microprocessor 200 controls the recording and reproduction apparatus 24 and the input/output control circuits $224_1$ to $224_n$ at the time of recording based on the input/output control signals input from each of the plurality of audio and/or video apparatuses such as editing apparatuses, video tape recorders (VTRs), or transmitting apparatuses and makes the recording and reproduction apparatus 24 to record the audio and/or video data input from the audio and/or video apparatus via the input/output control circuits $224_1$ to $224_n$.

Further, the microprocessor 200 controls the recording and reproduction apparatus 24 and the input/output control circuits $224_1$ to $224_n$ at the time of reproduction based on the input/output control signals input from each of the audio and/or video apparatuses via the control data IF $210_1$ to $210_n$, reproduces the audio and/or video data requested by an audio and/or video apparatus from the recording and reproduction apparatus 24, and supplies the same via the input/output control circuits $224_1$ to $224_n$ to the audio and/or video apparatus.

In the audio and/or video data recording and reproduction apparatus 8 shown in FIG. 1, however, the audio and/or video data recorded and reproduced with respect to the recording and reproduction apparatus 24, the control signals input from the audio and/or video apparatuses via the control data IFs $210_1$ to $210_n$, the occupied recording region data, and the empty recording region data are transmitted and received among the component parts via the same CPU bus 218, therefore a bottleneck occurs in the CPU bus 218.

Further, the microprocessor 200 must carry out the processing for the transmission protocol control between the audio and/or video apparatuses and the input/output control circuits $224_1$ to $224_n$ and for the recording region data and the processing of the input/output control signals input to the control data IFs $210_1$ to $210_n$, therefore the number of the control data IFs $210_1$ to $210_n$ and the input/output control circuits $224_1$ to $224_n$ cannot be increased so much.

Further, the recording region data and the audio and/or video data are recorded in the same recording and reproduction apparatus 24, so the load is also increased in the recording and reproduction apparatus 24 per se.

First Embodiment

Below, a first embodiment of the present invention will be explained.

Figure 2:
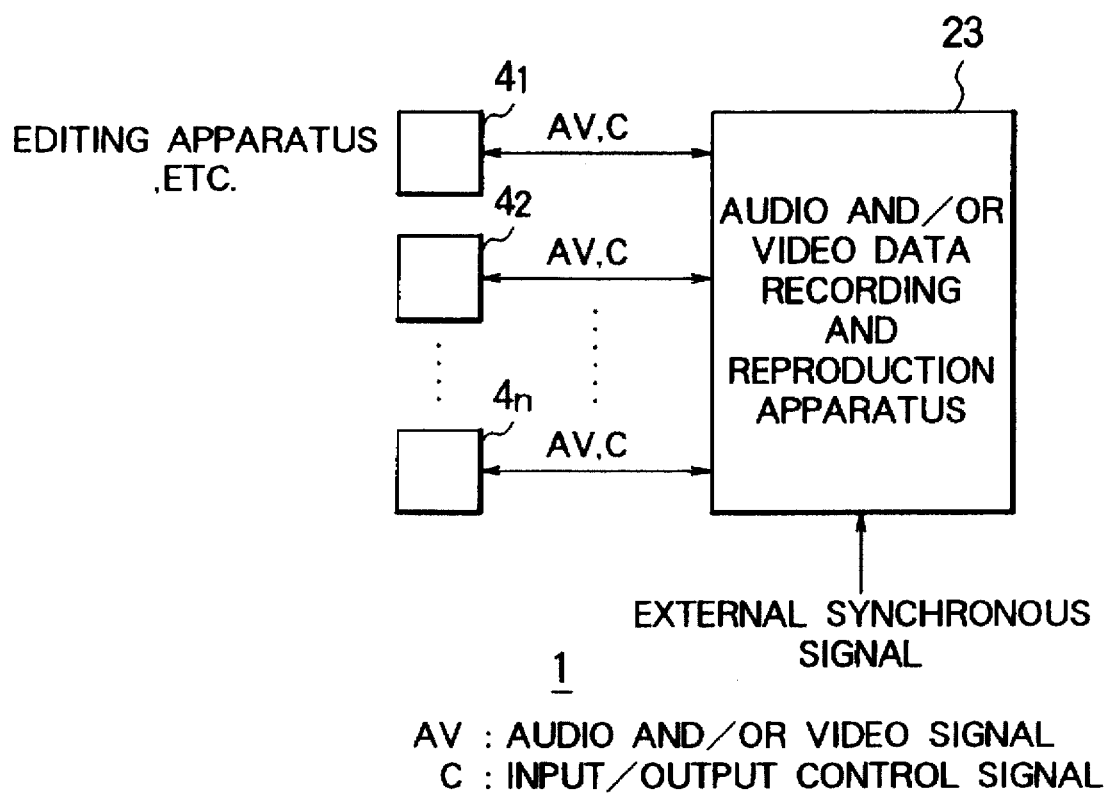
FIG. 2 is a view of the configuration of an audio and/or video data processing system according to the present invention.

FIG. 2 is a view of the configuration of an audio and/or video data processing system 1 according to the present invention.

As shown in FIG. 2, the audio and/or video data processing system 1 according to the present invention is constituted by audio and/or video apparatuses $4_1$ to $4_n$ such as editing apparatuses, transmitting apparatuses, or video tape recorders and by an audio and/or video data recording and reproduction apparatus 2.

Figure 3:
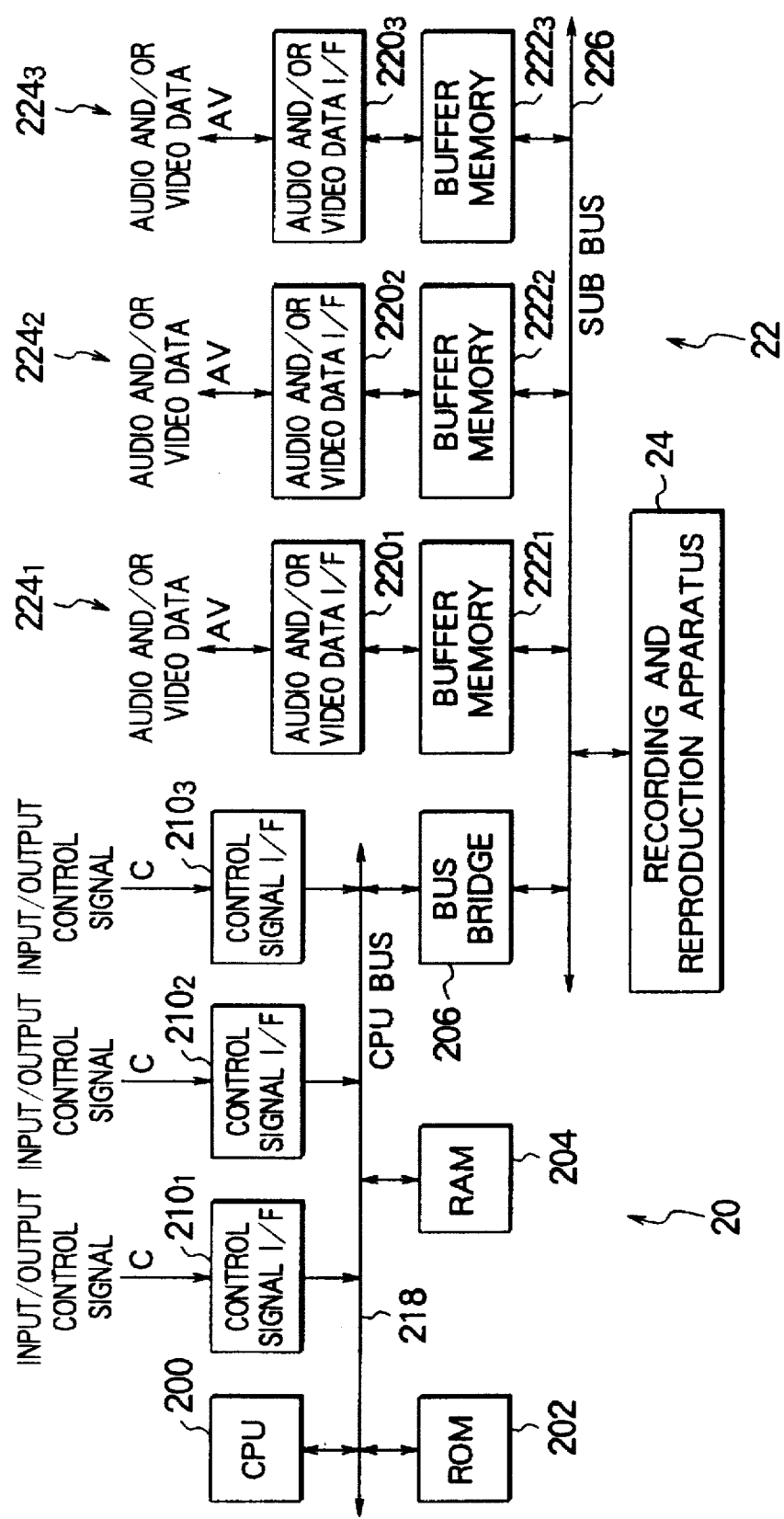
FIG. 3 is a view of the configuration of the audio and/or video data recording and reproduction apparatus shown in FIG. 2.

FIG. 3 is a view of the configuration of the audio and/or video data recording and reproduction apparatus 2 shown in FIG. 2.

As shown in FIG. 3, the audio and/or video data processing system 1 is constituted by a control device 20, an input/output device 22, and a recording and reproduction apparatus 24, buses of which being connected to each other by a bus bridge circuit 206.

The control device 20 is constituted by a microprocessor 200, a ROM 202, a RAM 204, and n number of control data IFs $210_1$ to $210_n$ (FIG. 3 is a case where n=3) connected to each other via a CPU bus 218.

The input/output device 22 is constituted by n number of input/output control circuits $224_1$ to $224_n$. The input/output control circuits $224_1$ to $224_n$ are respectively constituted by the audio and/or video data IFs $220_1$ to $220_n$ and buffer memories $222_1$ to $222_n$.

In the audio and/or video data processing system 1, the audio and/or video apparatuses $4_1$ to $4_n$ output input/output control signals containing the audio and/or video data for which the reproduction is requested to the audio and/or video data recording and reproduction apparatus 2 at the time of reproduction, make them reproduce the requested audio and/or video data, and receive the reproduced audio and/or video data.

The audio and/or video apparatuses $4_1$ to $4_n$ output input/output control signals for requesting recording to the control data IFs $210_1$ to $210_n$ of the audio and/or video data recording and reproduction apparatus 2 at the time of recording, supply the audio and/or video data for which the recording is requested to the input/output control circuits $224_1$ to $224_n$, and make them record the audio and/or video data in the recording and reproduction apparatus 24.

The audio and/or video data recording and reproduction apparatus 2 supplies the audio and/or video data (AV) to the audio and/or video apparatuses $4_1$ to $4_n$ and records the audio and/or video data obtained as the result of the editing by the audio and/or video apparatuses $4_1$ to $4_n$.

In the control device 20 of the audio and/or video data recording and reproduction apparatus 2, the microprocessor 200 is constituted by for example a general purpose microprocessor or one having an RISC (Reduced Instruction Set Computer) structure and peripheral circuits thereof and executes the programs stored in the ROM 202 by using the RAM 204.

The microprocessor 200 manages the recording regions occupied by the recorded audio and/or video data (occupied recording regions) in the recording medium (MO disc or a hard disc; not illustrated) of the recording and reproduction apparatus 24 and the empty recording regions, records the occupied recording region data indicating the occupied recording regions and the empty recording region data indicating the empty recording regions in the RAM 204, and further records these data in a predetermined recording region of the recording and reproduction apparatus 24 via a bus bridge circuit 206 and a sub-bus 226.

Further, the microprocessor 200 carries out operations such as the protocol control of the input/output control circuits $224_1$ to $224_n$ of the input/output device 22 via the CPU bus 218, the bus bridge circuit 206, and the sub-bus 226 and the designation of the recording regions of the audio and/or video data with respect to the recording and reproduction apparatus 24, etc.

The control data IFs $210_1$ to $210_n$ accept the input/output control signals input from the connected audio and/or video apparatuses $4_1$ to $4_n$ and output the same via the CPU bus 218 to the microprocessor 200.

The bus bridge circuit 206 adjusts the timing of the input/output of the data between the CPU bus 218 of the control device 20 and the sub-bus 226 of the input/output device 22.

In the input/output device 22, the input/output control circuits $224_1$ to $224_n$ operate according to the control of the microprocessor 200 of the control device 20, and at the time of recording, output the audio and/or video data input from the audio and/or video apparatuses $4_1$ to $4_n$ via the sub-bus 226 to the recording and reproduction apparatus 24 according to a predetermined protocol (for example, SCSI: Small Computer System Interface), and record the same in the designated recording regions of the recording medium of the recording and reproduction apparatus 24.

Further, the input/output control circuits $224_1$ to $224_n$ reproduce the audio and/or video data from the designated recording regions of the recording medium of the recording and reproduction apparatus 24 at the time of reproduction and supply the input audio and/or video data input via the sub-bus 226 to the audio and/or video apparatuses $4_1$ to $4_n$ according to a predetermined protocol.

In the input/output control circuits $224_1$ to $224_n$, the audio and/or video data IFs $220_1$ to $220_n$ output the audio and/or video data reproduced by the recording and reproduction apparatus 24 at the time of reproduction and input via the sub-bus 226 and the buffer memories $222_1$ to $222_n$ to the audio and/or video apparatuses $4_1$ to $4_n$.

Further, the audio and/or video data IFs $220_1$ to $220_n$ output the audio and/or video data input from the audio and/or video apparatuses $4_1$ to $4_n$ to the recording and reproduction apparatus 24 via the buffer memories $222_1$ to $222_n$ and the sub-bus 226 at the time of recording and makes them record the same.

The buffer memories $222_1$ to $222_n$ buffer the audio and/or video data input from the sub-bus 226 at the time of reproduction and output the buffered data to the audio and/or video data IFs $220_1$ to $220_n$ and buffer the audio and/or video data input from the audio and/or video data IFs $220_1$ to $220_n$ at the time of recording and output the buffered audio and/or video data via the sub-bus 226 to the recording and reproduction apparatus 24.

The recording and reproduction apparatus 24 is a hard disc array, a magnetic optical disc (MO) device, or the like, operates according to the control of the microprocessor 200, and records the audio and/or video data input from the input/output control circuits $224_1$ to $224_n$ via the sub-bus 226 in the randomly accessible recording medium (not illustrated) in the recording regions designated by the microprocessor 200.

Further, the recording and reproduction apparatus 24 outputs the audio and/or video data reproduced from the recording regions of the recording medium designated by the microprocessor 200 via the sub-bus 226 to the input/output control circuits $224_1$ to $224_n$.

Below, the operation of the audio and/or video data processing system i will be explained focusing on the operation of the audio and/or video data recording and reproduction apparatus 2.

Below, the explanation will be made taking as an example a case where the audio and/or video apparatus $4_1$ requests the recording and reproduction of the audio and/or video data with respect to the audio and/or video data recording and reproduction apparatus 2, but the operation where the audio and/or video apparatuses $4_2$ to $4_n$ request the recording and reproduction of the audio and/or video data with respect to the audio and/or video data recording and reproduction apparatus 2 is the same.

First, the operation of the audio and/or video data processing system i at the time of recording will be explained.

The audio and/or video apparatus $4_1$ outputs an input/output control signal containing predetermined data such as the name (file name) of the audio and/or video data for which the reproduction is requested and the data length to the control data IF $210_1$ of the control device 20 of the audio and/or video data recording and reproduction apparatus 2 connected.

The control data IF $210_1$ outputs the input/output control signal from the audio and/or video apparatus $4_1$ to the microprocessor 200.

The microprocessor 200 designates the recording region in which the input audio and/or video data is recorded based on the empty recording region data in the recording and reproduction apparatus 24 based on the file name, data length, etc. contained in the input/output control signal input from the control data IFs $210_1$ to $210_n$.

Further, the microprocessor 200 controls the input/output control circuit $224_1$ to make the same accept the audio and/or video data input by the predetermined protocol and record the same in the designated recording region of the recording medium of the recording and reproduction apparatus 24.

Further, the microprocessor 200 generates a file entry used for the search of the audio and/or video data and the occupied recording region data of the recorded audio and/or video data by using the file name etc. input from the audio and/or video apparatus $4_1$ and updates the empty recording region data.

Next, the operation of the audio and/or video data processing system 1 at the time of reproduction will be explained.

The audio and/or video apparatus $4_1$ outputs an input/output control signal containing the file name etc. of the audio and/or video data for which the reproduction is requested to the control data IF $210_1$.

The control data IF $210_1$ outputs this input/output control signal to the microprocessor 200.

The microprocessor 200 searches the file entry generated at the time of recording based on the file name of the input/output control signal, designates the recording region in which the audio and/or video data for which the reproduction is requested is recorded in the recording and reproduction apparatus 24 based on the occupied recording region data corresponding to the file entry obtained as a result of the search, and controls the recording and reproduction apparatus 24 to make it reproduce the audio and/or video data from the designated recording region.

Further, the microprocessor 200 controls the input/output control circuit $224_1$ to make it output the audio and/or video data reproduced by the predetermined protocol to the audio and/or video apparatus $4_1$.

Second Embodiment

Below, a second embodiment of the present invention will be explained.

In the audio and/or video data recording and reproduction apparatus 2 shown in the first embodiment (FIG. 2 and FIG. 3), the CPU bus 218 and the sub-bus 226 are separate, therefore the data regarding the generation of the recording region data and the audio and/or video data do not exist on the same bus and a bottleneck is not generated on the CPU bus 218.

However, the audio and/or video data and the data regarding the protocol control between the audio and/or video apparatuses $4_1$ to $4_n$ and the control data IFs $210_1$ to $210_n$ are mixed on the sub-bus 226, thus there is a possibility of occurrence of a bottleneck in the sub-bus 226.

Further, all of the processing load of the component parts of the audio and/or video data recording and reproduction apparatus 2 is carried by the microprocessor 200, therefore, in the same way as the audio and/or video data recording and reproduction apparatus 8 shown in FIG. 1, in the audio and/or video data recording and reproduction apparatus 2 as well (FIG. 2 and FIG. 3), the number of the control data IFs $210_1$ to $210_n$ and the input/output control circuits $224_1$ to $224_n$ cannot be greatly increased.

The audio and/or video data recording and reproduction apparatus 3 explained in the second embodiment is a further improvement of the audio and/or video data recording and reproduction apparatus 2 shown in the first embodiment and is configured so that the audio and/or video data and the other data such as the data regarding the protocol control are substantially not mixed on the same bus.

Further, the audio and/or video data recording and reproduction apparatus 3 is configured so that the load regarding the processing such as the protocol control and the recording region management is not concentrated at a specific microprocessor (data processing means), and the number of the connectable audio and/or video apparatuses can be greatly increased.

Figure 4:
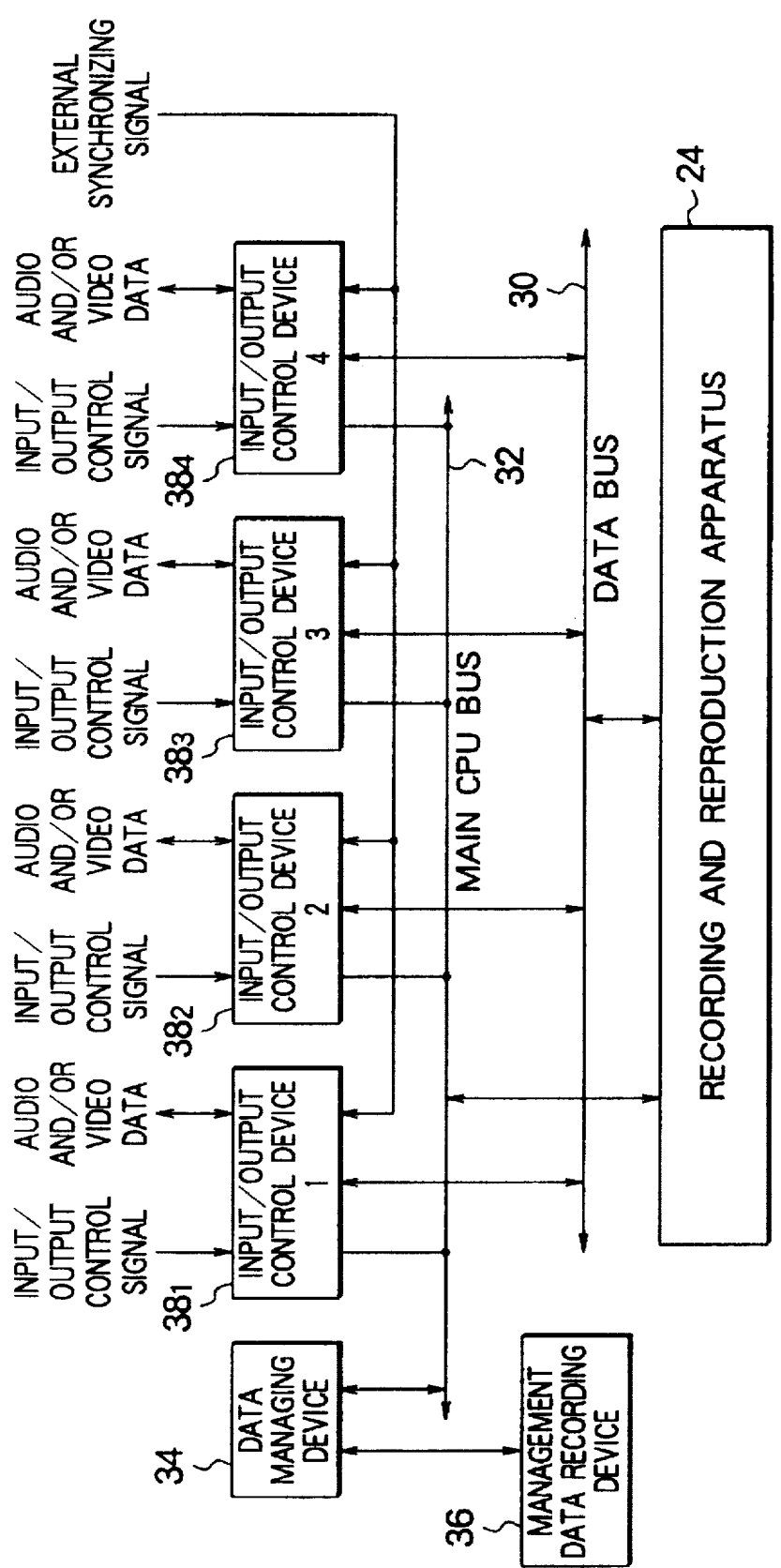
FIG. 4 is a view of the configuration of the audio and/or video data recording and reproduction apparatus according to the present invention in a second embodiment.

FIG. 4 is a view of the configuration of the audio and/or video data recording and reproduction apparatus 3 according to the present invention in a second embodiment. Note, FIG. 4 illustrates an audio and/or video data recording and reproduction apparatus 3 where n=4. Further, in FIG. 4 and the subsequent drawings, the same reference numerals are given to component parts the same as the component parts shown in FIG. 2 and FIG. 3.

The audio and/or video data recording and reproduction apparatus 3 is an apparatus used in place of the audio and/or video data recording and reproduction apparatus 2 (FIG. 2 and FIG. 3) in the audio and/or video data processing system 1 and is configured so that n number of input/output control devices $38_1$ to $38_n$ are bus-connected to the data managing device 34 having a management data recording device 36 via the main CPU bus 32 and bus-connected to the recording and reproduction apparatus 24 via the data bus 30.

The audio and/or video data recording and reproduction apparatus 3 records the audio and/or video data input from the audio and/or video apparatuses $4_1$ to $4_n$ in the recording medium of the recording and reproduction apparatus 24 according to the input/output control signals input from the audio and/or video apparatuses $4_1$ to $4_n$ by these component parts, reproduces the recorded audio and/or video data in accordance with the requests from the audio and/or video apparatuses $4_1$ to $4_n$, and supplies the same to the audio and/or video apparatuses $4_1$ to $4_n$.

Figure 5:
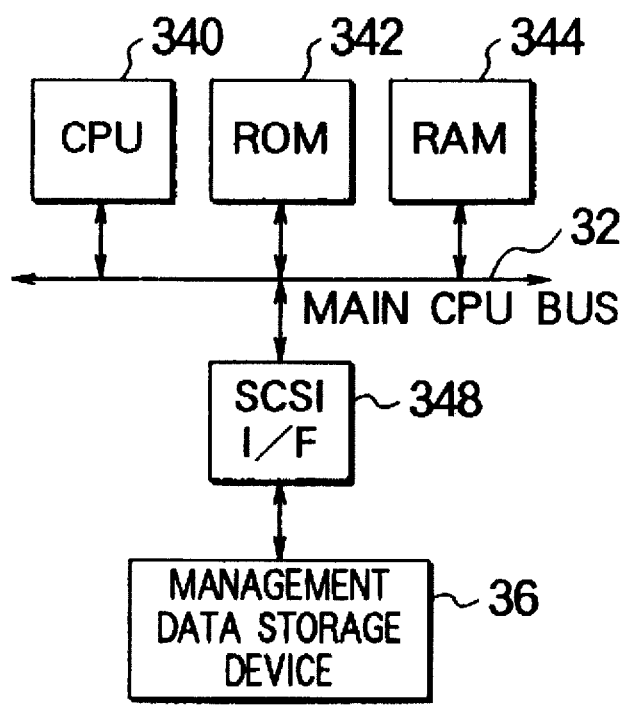
FIG. 5 is a view of the configuration of a data managing device shown in FIG. 4.

FIG. 5 is a view of the configuration of the data managing device 34 shown in FIG. 4.

As shown in FIG. 5, the data managing device 34 is configured by a microprocessor (CPU) 340, a ROM 342, a RAM 344, and an SCSI interface (SCSI IF) 348 bus-connected via the main CPU bus 32. To the SCSI IF 348 is connected a management data recording device 36, for example, a hard disc device.

In the data managing device 34, the microprocessor 340, the ROM 342, and the RAM 344 operate as the computer for executing the programs stored in the ROM 342, managing the recording regions of the recording medium of the recording and reproduction apparatus 24, generating the occupied recording regions and the empty recording regions of the recording and reproduction apparatus 24, and storing them in the RAM 344 and further recording the same in the management data recording device 36. Further, the data managing device 34 allocates the recording regions to the audio and/or video data input from the audio and/or video apparatuses $4_1$ to $4_n$ for recording according to the requests from the input/output control devices $38_1$ to $38_n$ and notifies the occupied recording regions of the audio and/or video data for which the reproduction was requested to the input/output control devices $38_1$ to $38_n$.

FIG. 6A to FIG. 6D are views illustrating the occupied recording regions of the audio and/or video data A and B recorded in the recording regions of the recording medium of the recording and reproduction apparatus 24 shown in FIG. 4, the occupied recording region data (file entry and the record entry) of the audio and/or video data A and B generated by the data managing device 34, and the empty recording region data (free space list).

FIG. 7A to FIG. 7C are views illustrating the contents of the recording region data generated by the data managing device 34 shown in FIG. 4.

Figure 6A:
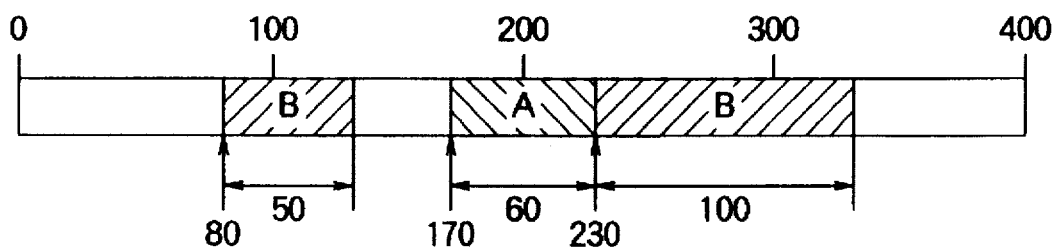
FIG. 6A to FIG. 6D are views illustrating occupied recording regions of the audio and/or video data A and B recorded in the recording regions of the recording medium of the recording and reproduction apparatus shown in FIG. 4, the occupied recording region data of the audio and/or video data A and B, and the empty recording region data generated by the data managing device.

For example, as shown in FIG. 6A, the audio and/or video data A and B are recorded in the recording medium of the hard disc array device 24. The audio and/or video data B is recorded from the 80th block to 129th block from the head of the recording medium and from the 230th block to 329th block (one block is for example one gigabyte (GB)), while the audio and/or video data A is recorded from the 170th block to 229th block from the head of the recording medium. The other recording regions are the empty recording regions.

A situation where the audio and/or video data A and B are recorded as shown in FIG. 6A may occur in a case where, for example, when the audio and/or video data is recorded, the 170th block and subsequent blocks of the recording medium exist as the empty recording regions nearest the head of the recording region, all of the audio and/or video data A is recorded in the 170th block to 229th block, and, thereafter, the audio and/or video data recorded in the 80th block to 129th block is deleted, this recording region is released and becomes an empty recording region, the part on the head side of the audio and/or video data B is recorded in this part, and the part on the rear side is recorded in the 230th block and subsequent blocks.

Figure 6B:
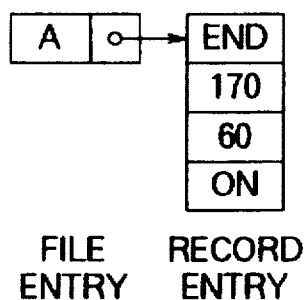
Figure 6C:
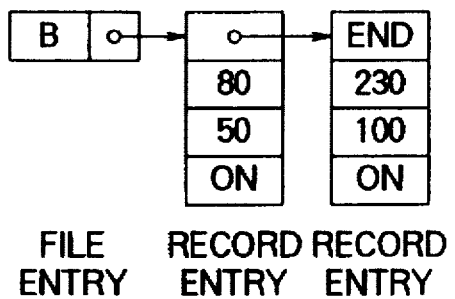

In this way, there is a case where one series of audio and/or video data will be divided and recorded in a plurality of recording regions, so the data managing device 34 respectively prepares the occupied recording region data of the audio and/or video data A and B as the file entry and record entry of the linked list format shown in FIG. 6B and FIG. 6C. Further, the data managing device 34 stores the link data (file entry) indicating the file name and the first record entry in the RAM 344 as shown in FIG. 7A for each of the audio and/or video data A and B.

Further, the data managing device 34 adds an identification flag (delete enable flag) indicating whether or not the audio and/or video data to which the record entry corresponds can be deleted to the record entry stored in the RAM 344. Note that, among the values of the delete enable flag, ON indicates delete enable and OFF indicates delete unable.

The reason why the delete enable flag is added to the record entry in this way is that, for example, where part of the audio and/or video data recorded in the recording and reproduction apparatus 24 is referred to by another record entry, the referred audio and/or video data is prevented from being unnecessarily deleted.

Each of the record entries is comprised by, as shown in FIG. 7B, link data indicating the next record entry, head position data indicating the head position of the recording region, and the recording length data indicating the length of the recording region. Note that, where the link data is the end value (END), the next record entry does not exist, and the last part of the audio and/or video data is recorded in the recording region indicated by that record entry.

Figure 6D:
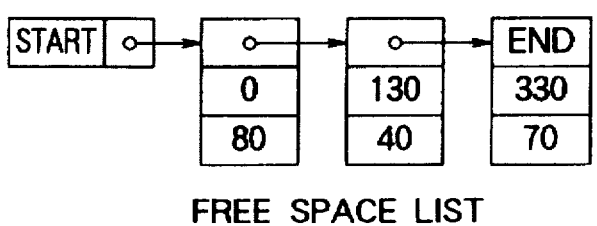

Further, the data managing device 34 generates empty recording region data indicating the empty recording regions of the hard disc array device 24 (free space) as a list (free space list) of a linked list format as shown in FIG. 6D. The free space list is comprised by, as shown in FIG. 7C, link data of the next empty recording region, head position data indicating the head position of the empty recording region, and the recording length data indicating the length of the empty recording region.

Note that, the microprocessor 340 of the data managing device 34 records the updated date in the management data recording device 36 via the SCSI IF 348 whenever each data is updated. At the startup of the audio and/or video data recording and reproduction apparatus 3, the data managing device 34 reproduces the data recorded in the management data recording device 36 from the management data recording device 36 and updates the data based on the reproduced data and input/output control signals input from the audio and/or video apparatuses $4_1$ to $4_n$ etc. after the startup FIG. 8 is a view of the configuration of one of the input/output control devices $38_1$ to $38_n$ shown in FIG. 4.

Figure 8:
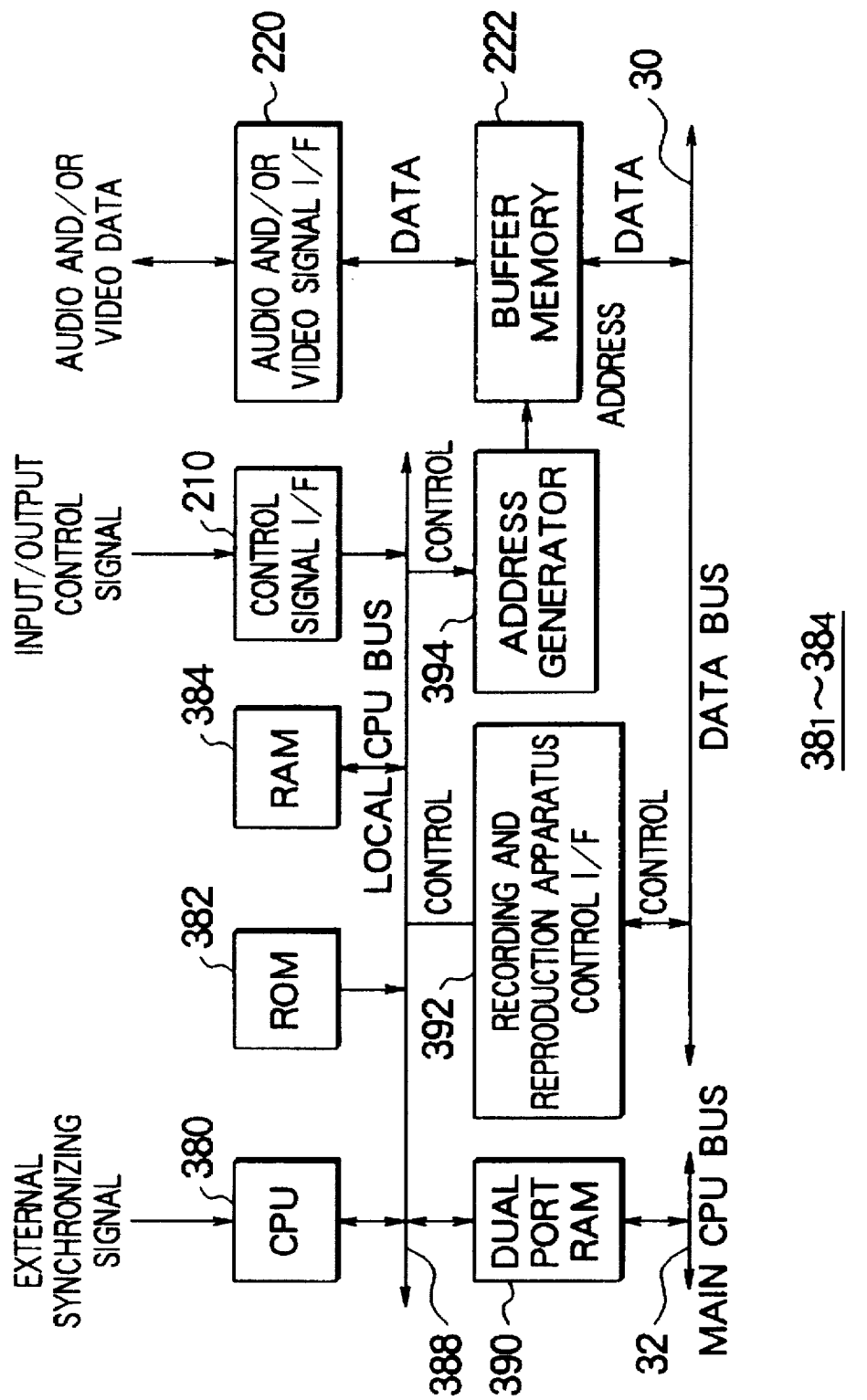
FIG. 8 is a view of the configuration of the input/output control devices shown in FIG. 4.

As shown in FIG. 8, the input/output control device $38_i$ is constituted by the microprocessor (CPU) 380, ROM 382, RAM 384, control data IF 210 (same as control data IF $210_1$ to $210_n$ (FIG. 3)), and the address generating circuit 394 bus-connected via a local CPU bus 388 closed in the input/output control device $38_i$, a dual port RAM 390 connecting the main CPU bus 32 (FIG. 4) and a local CPU bus 388, a recording and reproduction apparatus control interface (recording and reproduction apparatus IF) 392 connecting the local CPU bus 388 and the data bus 30, and a buffer memory 222 (corresponding to the buffer memories $222_1$ to $222_n$) and the audio and/or video data IF 220 (same as the audio and/or video data IF $220_1$ to $220_n$) connected to the data bus 30. To the audio and/or video data IF 220 of the input/output control devices $38_1$ to $38_n$ are connected the audio and/or video apparatus $4_i$ (FIG. 2).

At the time of recording, using these component parts, the input/output control device $38_i$ accesses the data managing device 34 according to the input/output control signal containing data such as the file name and data length from the audio and/or video apparatus $4_i$, receives the allocation of the recording regions for recording the audio and/or video data for which the recording was requested from the recording and reproduction apparatus 24, designates the allocated recording regions in the recording and reproduction apparatus 24, and records the audio and/or video data being input according to the predetermined protocol such as SCSI in the designated recording regions.

Further, at the time of reproduction, the input/output control device $38_i$ accesses the data managing device 34 according to an input/output control signal containing data such as the file name from the audio and/or video apparatus $4_i$, receives the notification of the occupied recording regions of the audio and/or video data for which the reproduction was requested, reproduces the audio and/or video data from the notified occupied recording regions, and outputs the reproduced audio and/or video data to the audio and/or video apparatus $4_i$ by the predetermined protocol.

In the input/output control device $38_i$, the microprocessor 380, the ROM 382, and the RAM 384 operate as a computer stored in the ROH 382 controlling the component parts of the input/output control device $38_i$ and executing the recording and reproduction of the audio and/or video data with respect to the recording and reproduction apparatus 24 and the protocol control with the audio and/or video apparatus $4_i$.

The dual port RAM 390 supplies the data being input from the data managing device 34 side via the main CPU bus 32 to the microprocessor 380 via the local CPU bus 388 and supplies the data input from the local CPU bus 388 to the data managing device 34 via the main CPU bus 32.

The recording and reproduction apparatus IF 392 supplies to the recording and reproduction apparatus 24 the data output from the microprocessor 380 to the recording and reproduction apparatus 24 and supplies to the microprocessor 380 the data output from the recording and reproduction apparatus 24 to the microprocessor 380.

The address generating circuit 394 generates the address of the buffer memory 222 according to the control of the microprocessor 380 and controls the buffering operation of the buffer memory 222.

The operation of the input/output control device $38_i$ where the audio and/or video apparatus $4_i$ requests the reproduction of the audio and/or video data to the audio and/or video data recording and reproduction apparatus 3 will be explained below.

The audio and/or video apparatus $4_i$ outputs the input/output control signal containing the file name of the audio and/or video data for which the reproduction is requested etc. and requesting the reproduction of the audio and/or video data to the control data IF 210 of the input/output control device $38_i$.

This input/output control signal is input to the microprocessor 380 from the control data IF 210. The microprocessor 380 inquires about the occupied recording regions of the audio and/or video data for which the reproduction was requested to the data managing device 34 via the dual port RAM 390.

The data managing device 34 searches for the file entry (FIG. 6B and FIG. 6C) by using the inquired file name of the audio and/or video data, finds the corresponding record entry, and notifies the same to the input/output control device $38_i$.

The microprocessor 380 notified of the record entry designates the occupied recording regions of the audio and/or video data to be reproduced in the recording and reproduction apparatus 24 via the data bus 30 and the recording and reproduction apparatus IF 392 and makes the recording and reproduction apparatus 24 reproduce the data.

Further, when the reproduced audio and/or video data is input to the buffer memory 222 from the recording and reproduction apparatus 24 via the data bus 30, the microprocessor 380 carries out the protocol control with the recording and reproduction apparatus 24.

Further, the microprocessor 380 controls the buffering operation of the buffer memory 222 via the address generating circuit 394 and further carries out the protocol control with the audio and/or video apparatus $4_i$ and outputs the data to the audio and/or video apparatus $4_i$ via the audio and/or video data IF 220.

The operation of the input/output control device $38_i$ where the audio and/or video apparatus $4_i$ requests the recording of the audio and/or video data to the audio and/or video data recording and reproducing 3 will be explained below.

The audio and/or video apparatus $4_i$ outputs an input/output control signal containing the file name and data length of the audio and/or video data for which the recording is requested and requesting the recording of the audio and/or video data to the control data IF 210 of the input/output control device 38$_i$. This input/output control signal is input to the microprocessor 380 from the control data IF 210. The microprocessor 380 requests the allocation of the recording region to the data managing device 34 via the dual port RAM 390. The data managing device 34 allocates the recording regions based on the empty recording regions and the data length of the audio and/or video data and notifies this to the microprocessor 380 via the dual port RAM 390.

The microprocessor 380 receiving the notification of the allocation of the recording regions designates the recording regions in the recording and reproduction apparatus 24 via the data bus 30 and the recording and reproduction apparatus IF 392. When the audio and/or video data is input from the audio and/or video apparatus 4$_i$ to the audio and/or video data IF 220, the microprocessor 380 carries out the protocol control with the audio and/or video apparatus 4$_i$.

Further, the microprocessor 380 controls the address generating circuit 394, controls the buffering operation of the buffer memory 222, and carries out the protocol control with the recording and reproduction apparatus 24.

Further, the microprocessor 380 outputs the audio and/or video data input from the audio and/or video apparatus 4$_i$ to the recording and reproduction apparatus 24 via the data bus 30, designates the audio and/or video data in the recording and reproduction apparatus 24, and makes it record the same.

Below, the operation of the audio and/or video data processing system 1 using the audio and/or video data recording and reproduction apparatus 3 shown in FIG. 4 will be explained.

First, an explanation will be made of the operation where, in the audio and/or video data processing system 1, the audio and/or video data recording and reproduction apparatus 3 reproduces the audio and/or video data supplied from the audio and/or video apparatus 4$_i$ from the recording and reproduction apparatus 24.

Figure 9:
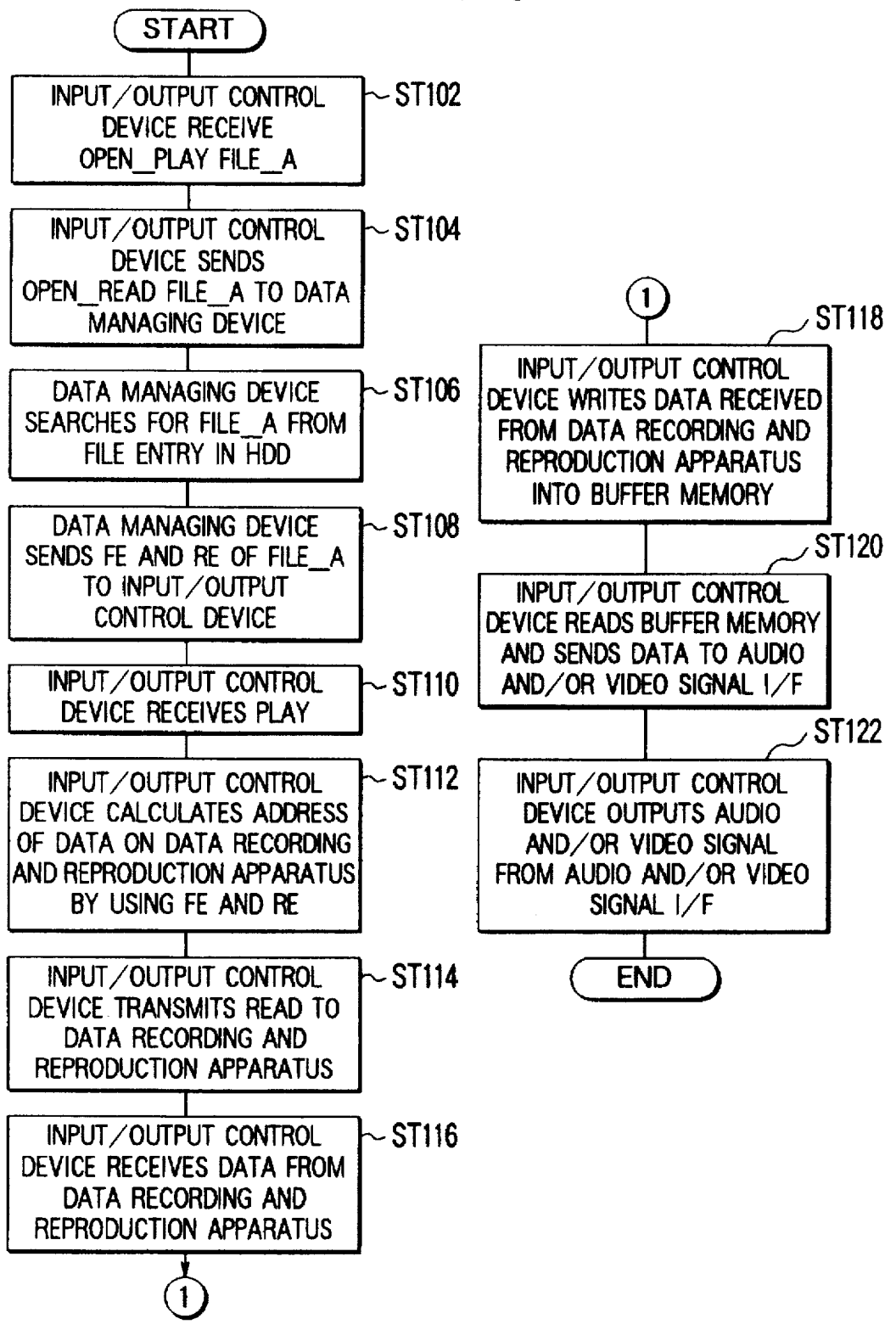
FIG. 9 is a flow chart of a processing where the audio and/or video data recording and reproduction apparatus supplies the input audio and/or video data reproduced from the recording and reproduction apparatus shown in FIG. 4 to the audio and/or video apparatus shown in FIG. 2 in the second embodiment.

FIG. 9 is a flow chart showing the processing where, in the second embodiment, the audio and/or video data recording and reproduction apparatus 3 supplies the input audio and/or video data reproduced from the recording and reproduction apparatus 24 shown in FIG. 4 to the audio and/or video apparatus 4$_i$ shown in FIG. 2.

Figure 10:
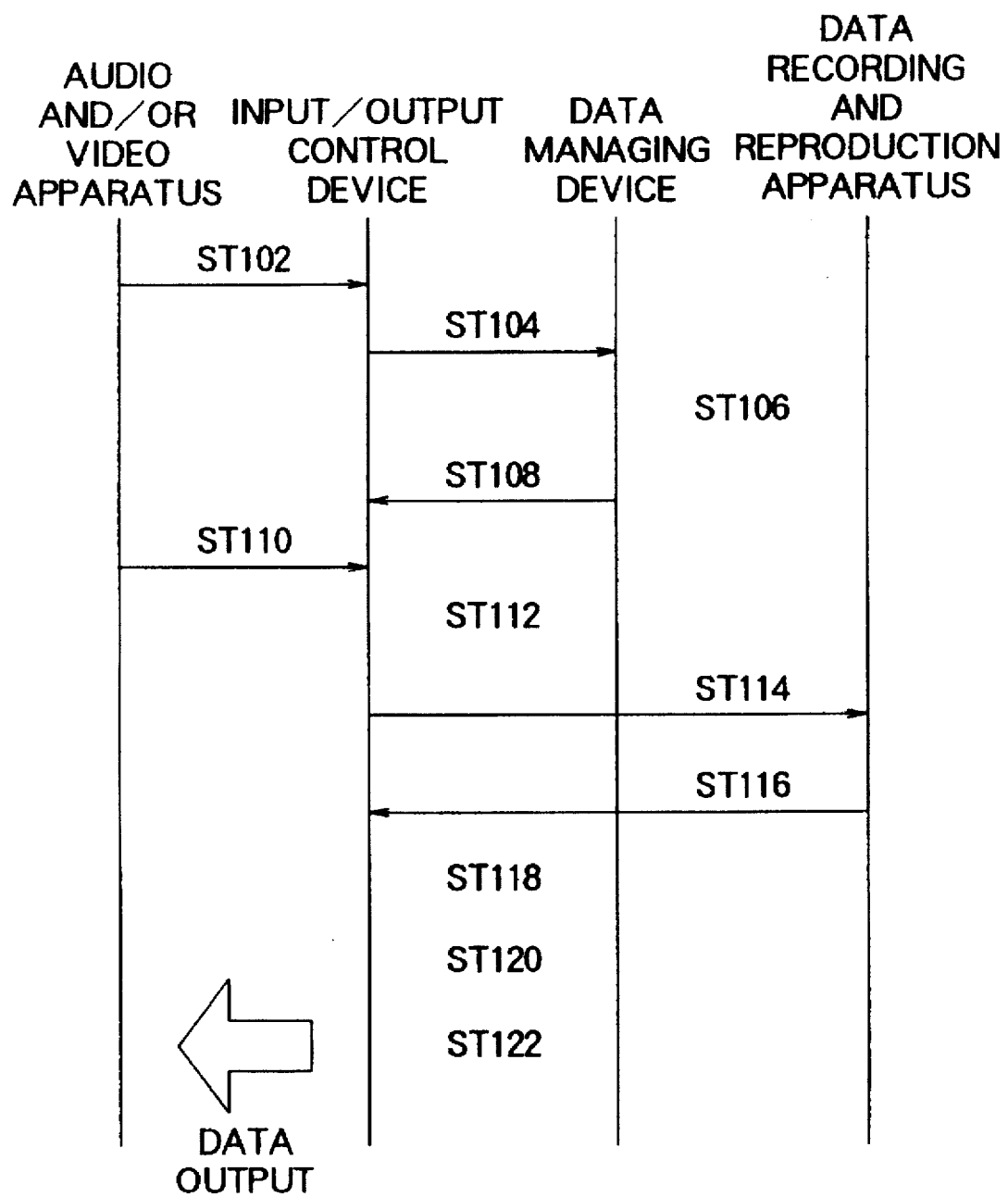
FIG. 10 is a signal sequence diagram among the audio and/or video apparatus, input/output control device, the data managing device, and the recording and reproduction apparatus where the audio and/or video data recording and reproduction apparatus supplies the input audio and/or video data reproduced from the recording and reproduction apparatus shown in FIG. 4 to the audio and/or video apparatus shown in FIG. 2.

FIG. 10 is a signal sequence diagram among the audio and/or video apparatus 4$_i$, the input/output control device 38$_i$, the data managing device 34, and the recording and reproduction apparatus 24 where the audio and/or video data recording and reproduction apparatus 3 supplies the input audio and/or video data reproduced from the recording and reproduction apparatus 24 shown in FIG. 4 to the audio and/or video apparatus 4$_i$ shown in FIG. 2.

As shown in FIG. 9 and FIG. 10, at step 102 (ST102), the audio and/or video apparatus 4$_i$ outputs an OPEN_PLAY command containing file name FILE_A of the audio and/or video data A (for example, FIG. 6A) and indicating the reproduction of the audio and/or video data A recorded in the recording and reproduction apparatus 24 to the audio and/or video data recording and reproduction apparatus 3. The input/output control device 38$_i$ receives this OPEN_PLAY command.

At step 104 (ST104), the input/output control device 38$_i$ outputs the OPEN_PLAY command to the data managing device 34.

At step 106 (ST106), the data managing device 34 reads out the file entry (FE) recorded in the management data recording device 36, searches for the record entry (RE) of the audio and/or video data A by using the file name FILE_A, and finds the record entry of the audio and/or video data A.

At step 108 (ST108), the data managing device 34 outputs the file entry and record entry of the found audio and/or video data A to the input/output control device 38$_i$.

At step 110 (ST110), the audio and/or video apparatus 4$_i$ outputs the PLAY command for starting the reproduction of the audio and/or video data A to the audio and/or video data recording and reproduction apparatus 3. The input/output control device 38$_i$ receives this PLAY command.

At step 112 (ST112) and step 114 (ST114), the input/output control device 38$_i$ calculates the occupied recording region of the audio and/or video data based on the file entry and the record entry of the audio and/or video data A input from the data managing device 34, designates the same in the recording and reproduction apparatus 24, and further outputs a READ command to the recording and reproduction apparatus 24.

At step 116 (ST116), the recording and reproduction apparatus 24 reproduces the audio and/or video data A from the designated recording region and outputs this to the input/output control device 38$_i$. The input/output control device 38$_i$ receives the reproduced audio and/or video data A.

At step 118 (ST118), the input/output control device 38$_i$ writes the received audio and/or video data A in the buffer memory 222.

At step 120 (ST120), the input/output control device 38$_i$ reads out the audio and/or video data A from the buffer memory 222 and outputs the same to the audio and/or video data IF 220.

At step 122 (ST122), the input/output control device 38$_i$ outputs the reproduced audio and/or video data to the audio and/or video apparatus 4$_i$ via the audio and/or video data IF 220.

Next, an explanation will be made of the operation where, in the audio and/or video data processing system 1, the audio and/or video data recording and reproduction apparatus 3 records the audio and/or video data for which the reproduction was requested from the audio and/or video apparatus 4$_i$ in the recording and reproduction apparatus 24.

Figure 11:
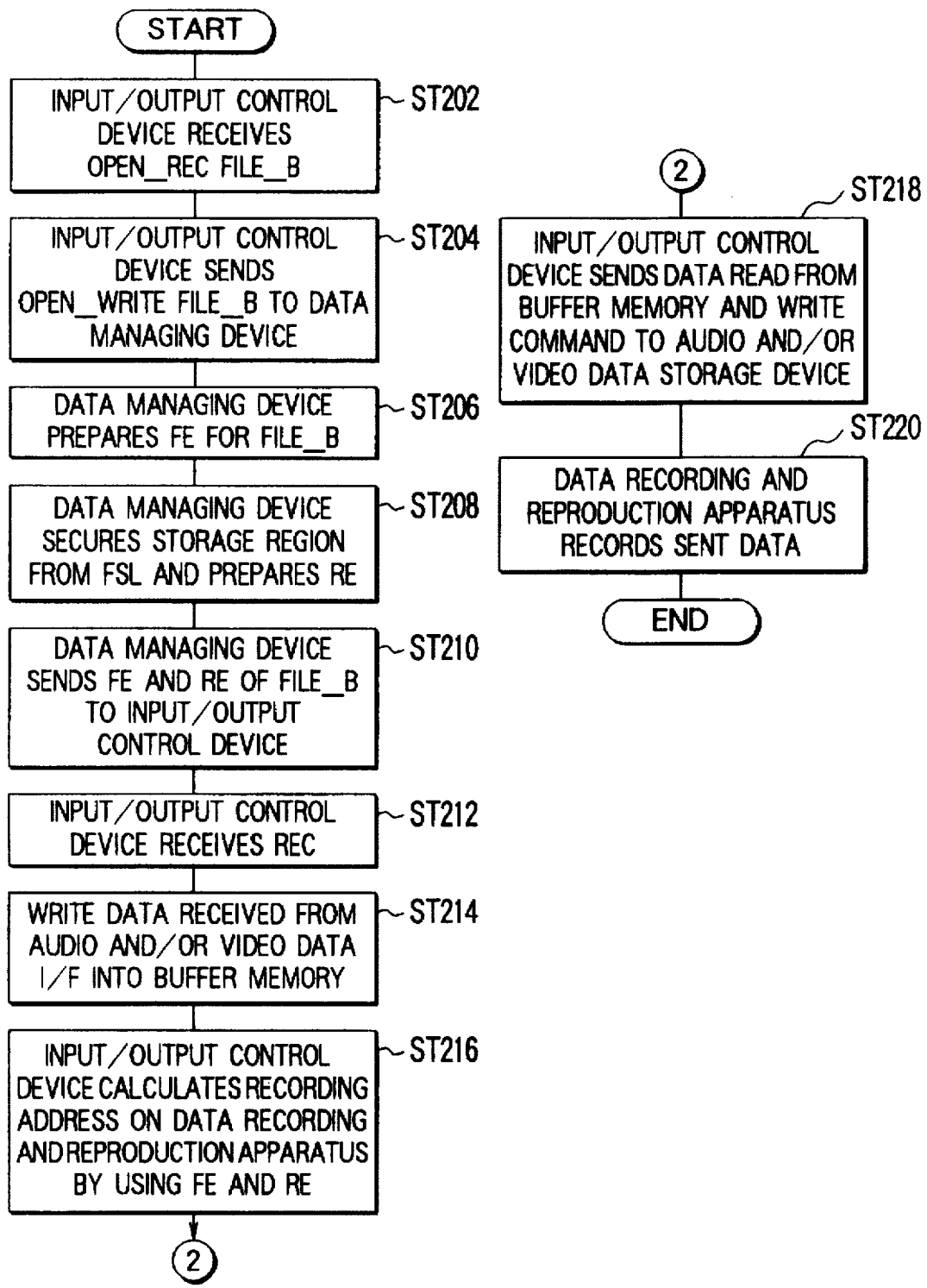
FIG. 11 is a flow chart of a processing where the audio and/or video data recording and reproduction apparatus records the audio and/or video data input from the audio and/or video apparatus shown in FIG. 2 in the recording and reproduction apparatus shown in FIG. 4 in the second embodiment.

FIG. 11 is a flow chart showing the processing in a case where, in the second embodiment, the audio and/or video data recording and reproduction apparatus 3 records the audio and/or video data input from the audio and/or video apparatus 4$_i$ shown in FIG. 2 in the recording and reproduction apparatus 24 shown in FIG. 4.

Figure 12:
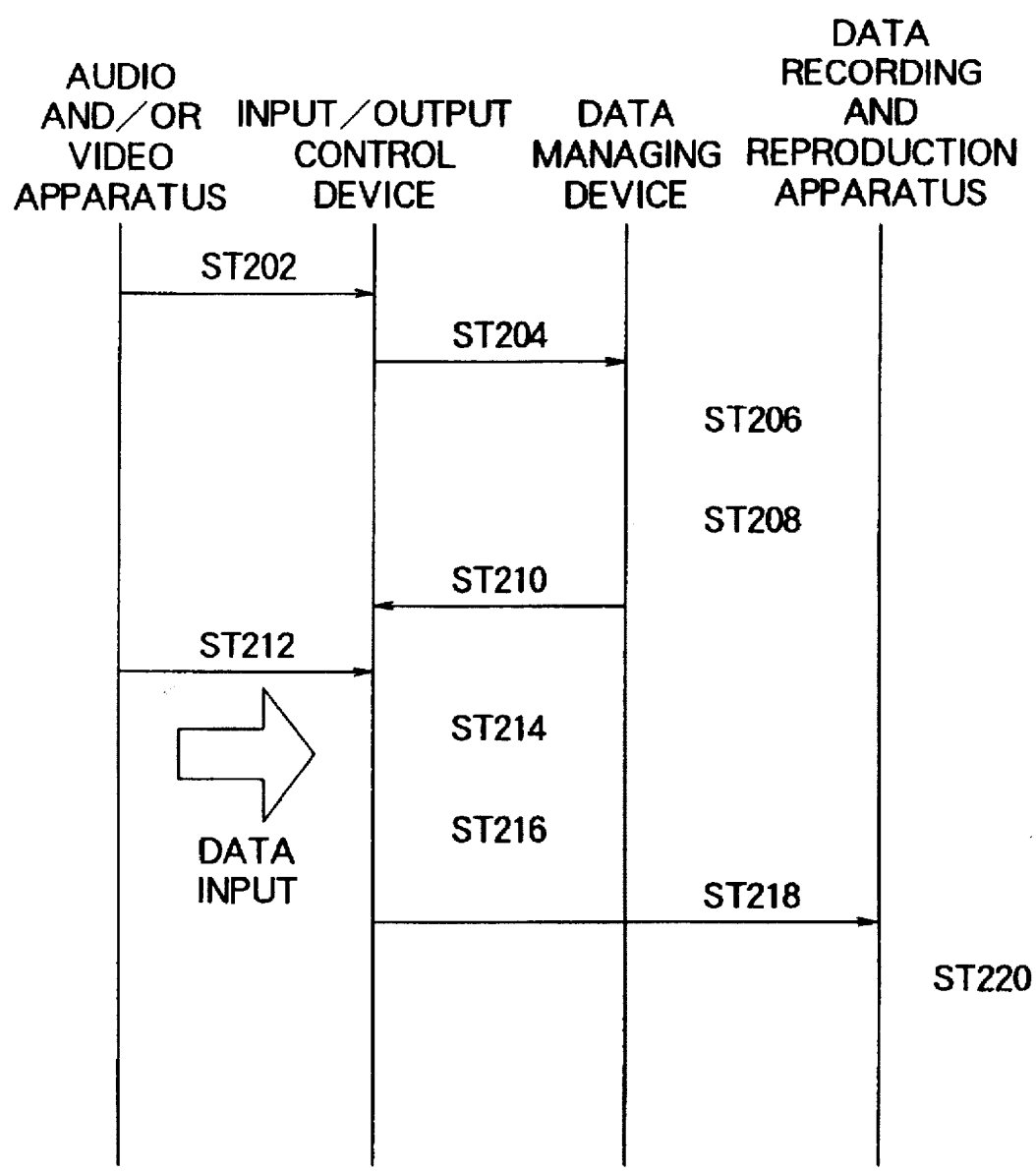
FIG. 12 is a signal sequence diagram among the audio and/or video apparatus, input/output control device, the data managing device, and the recording and reproduction apparatus where the audio and/or video data recording and reproduction apparatus records the audio and/or video data input from the audio and/or video apparatus shown in FIG. 2 in the recording and reproduction apparatus shown in FIG. 4.

FIG. 12 is a signal sequence diagram among the audio and/or video apparatus 4$_i$, the input/output control device 38$_i$, the data managing device 34, and the recording and reproduction apparatus 24 in a case where, in the second embodiment, the audio and/or video data recording and reproduction apparatus 3 records the audio and/or video data input from the audio and/or video apparatus 4$_i$ shown in FIG. 4 in the recording and reproduction apparatus 24 shown in FIG. 4.

As shown in FIG. 11 and FIG. 12, at step 202 (ST202), the audio and/or video apparatus 4$_i$ outputs to the audio and/or video data recording and reproduction apparatus 3 as the input/output control signal the OPEN_REC command containing the file name FILE_B and data length of the audio and/or video data B for carrying out the preparations for recording the audio and/or video data B (for example, FIG.

6A) to the input/output control device $38_i$. The input/output control device $38_i$ of the audio and/or video data recording and reproduction apparatus 3 receives this OPEN_REC command.

At step 204 (ST204), the input/output control device $38_i$ transmits the OPEN_WRITE command containing the file name FILE_B and the data length and requesting the allocation of the recording regions for recording the audio and/or video data B to the data managing device 34.

At step 206 (ST206), the data managing device 34 generates the file entry (FIG. 6B and FIG. 6C) based on the file name FILE_B contained in the OPEN_WRITE command input from the input/output control device $38_i$, stores this in the RAM 344, and records the same in the management data recording device 36.

At step 208 (ST208), the data managing device 34 secures the storage region for recording the audio and/or video data B based on the data length of the audio and/or video data B and the free space list (FIG. 6D) and generates the record entry (RE: FIG. 6B and FIG. 6C).

At step 210 (ST210), the data managing device 34 outputs the record entry and the file entry to the input/output control device $38_i$.

At step 212 (ST212), the audio and/or video apparatus $4_i$ outputs the REC command for starting the recording of the audio and/or video data to the audio and/or video data recording and reproduction apparatus 3. The control data IF 210 of the input/output control device $38_i$ receives this REC command.

At step 214 (ST214), the audio and/or video data IF 220 of the input/output control device $38_i$ writes the audio and/or video data B input from the audio and/or video apparatus $4_i$ in the buffer memory 222.

At step 216 (ST216), the input/output control device $38_i$ calculates the recording regions of the recording medium of the recording and reproduction apparatus 24 for recording the audio and/or video data B based on the record entry and the file entry received from the data managing device 34.

At step 218 (ST218), the input/output control device $38_i$ designates the recording regions for recording the audio and/or video data B in the recording and reproduction apparatus 24 via the recording and reproduction apparatus IF 392, inputs the write command, and controls the recording and reproduction apparatus 24 to make it record the audio and/or video data B stored in the buffer memory 222 in the designated recording regions.

At step 220 (ST220), the recording and reproduction apparatus 24 records the audio and/or video data B input from the input/output control-device $38_i$ in the designated recording regions of the recording medium.

Next, an explanation will be made of the processing for updating the free space list by the data managing device 34 of the audio and/or video data recording and reproduction apparatus 3.

When the input/output control signal containing the file name of the audio and/or video data which is to be deleted and indicating the deletion of the audio and/or video data recorded in the recording and reproduction apparatus 24 is output from the audio and/or video apparatus $4_i$ to the audio and/or video data recording and reproduction apparatus 3, the input/output control device $38_i$ receives this input/output signal and outputs the same to the data managing device 34.

The data managing device 34 searches for the file entry by using the file name contained in this input/output signal and examines the delete enable flag of the record entry corresponding to the file name. The data managing device 34 deletes the record entry and the file entry, releases the recording region in which the corresponding audio and/or video data is recorded, and updates the free space list only in a case where the delete enable flag is ON.

The data managing device 34 further records the updated free space list in the management data recording device 36.

As explained above in the second embodiment, in the audio and/or video data recording and reproduction apparatus 3 according to the present invention, the audio and/or video data and the other data such as the data regarding the protocol control are substantially not mixed on the same bus.

Accordingly, in the audio and/or video data recording and reproduction apparatus 3, the load regarding the processing such as the protocol control and the recording region management is not concentrated at a specific microprocessor, therefore the number of the input/output control devices $38_i$ and the number of the connected audio and/or video apparatuses $4_i$ can be greatly increased in comparison with the audio and/or video data recording and reproduction apparatus 2 shown in the first embodiment.

Further, even in a case where a large amount of the audio and/or video data is transmitted and received on the data bus 30, the data regarding the protocol control and the recording region management do not collide with the audio and/or video data, processing regarding the protocol control and the recording region management can be quickly executed, and the response regarding the recording and reproduction of the audio and/or video data with respect to the audio and/or video apparatus $4_i$ is fast.

Note that, the audio and/or video data recording and reproduction apparatus 3 can be used for the recording and reproduction of other data, for example data for a computer, other than the audio and/or video data.

Further, the processing contents shown in the flow chart etc. in the second embodiment are examples. Other processing procedures can be adopted so far as the same function and performance can be guaranteed.

Further, in the audio and/or video data recording and reproduction apparatus 3, so far as the equivalent function and performance can be guaranteed, there is no problem if component parts are constituted by software or hardware.

Third Embodiment

Below, a third embodiment of the present invention will be explained.

The audio and/or video data recording and reproduction apparatus 3 shown in the third embodiment records a plurality of series of audio data and video data or one of the same (audio and/or video data) in the recording and reproduction apparatus 24 in the same way as the audio and/or video data recording and reproduction apparatus 3 shown in the second embodiment and provides the audio and/or video data for the editing to the audio and/or video apparatus $4_i$ in accordance with the request from the audio and/or video apparatus $4_i$ connected to the audio and/or video data recording and reproduction apparatus 3 (input/output control device $38_i$).

If the editing is carried out by using the audio and/or video data recording and reproduction apparatus 3 shown in the second embodiment, however, it is necessary to record also the audio and/or video data obtained as the result of the editing in the recording and reproduction apparatus 24 (edited data) together with the audio and/or video data (raw data) for the editing. Therefore, in the third embodiment, an explanation will be made of the audio and/or video data recording and reproduction apparatus 3 improved so as to receive the data (editing data) indicating which part of the raw data is used in the edited data from the audio and/or video apparatus $4_i$ and reproduce the audio and/or video data having the same content as that of the edited data based on this editing data.

More specifically, in the audio and/or video data recording and reproduction apparatus 3 in the third embodiment, the content of the ROM 382 of the input/output control device $38_i$ is changed. The input/output control device $38_i$ is given, in addition to the function shown in the second embodiment, the function of supplying the audio and/or video data having the same content as that of the edited data to the audio and/or video apparatus $4_i$ by reproducing the data combining the part contained in the edited data of the raw data recorded in the recording and reproduction apparatus 24 (partial data) based on the editing data input from the audio and/or video apparatus $4_i$ (FIG. 2) as the input/output control signal and the occupied recording region data managed by the data managing device 34.

An explanation will be made of the content of the processing for generating the audio and/or video data having the same content as that of the edited data mentioned above by the input/output control device $38_i$ by describing a concrete example.

Figures 13A, 13B:
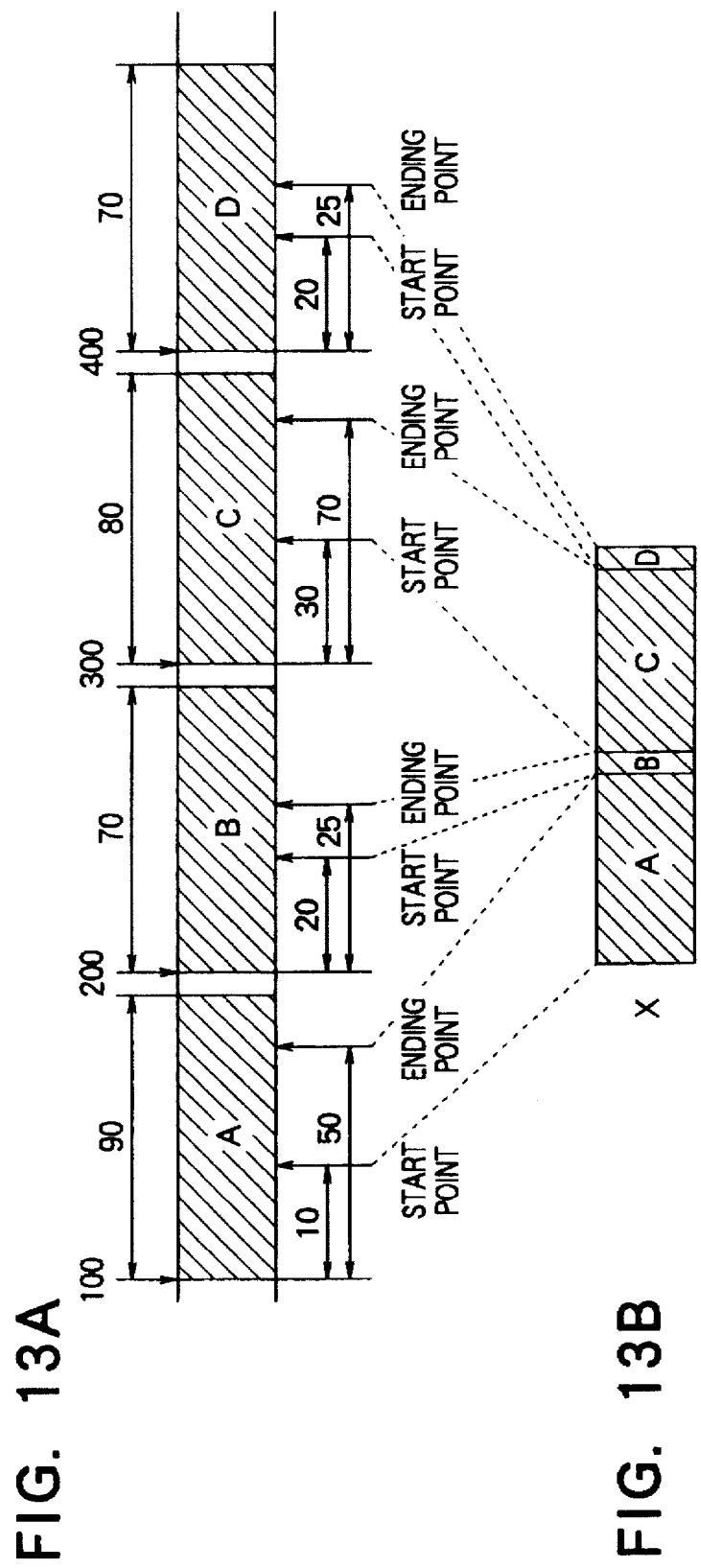
FIG. 13A is a view of the occupied recording regions occupied by the audio and/or video data A to D in the recording medium of the recording and reproduction apparatus shown in FIG. 4 in the third embodiment.
FIG. 13B is a view illustrating the edited data obtained as the result of the cutting for part of the audio and/or video data A to D.

FIG. 13A is a view of the occupied recording regions occupied by the audio and/or video data A to D in the recording medium of the recording and reproduction apparatus 24 shown in FIG. 4 in the third embodiment; and FIG. 13B is a view illustrating the audio and/or video data (edited data) obtained as the result of the editing (cutting) taking out part of the audio and/or video data A to D and connecting the same.

FIG. 14 is a view of the content of the editing data output by the audio and/or video apparatus $4_i$ shown in FIG. 2 to the input/output control device $38_i$ of the audio and/or video data recording and reproduction apparatus 3 for reproducing the audio and/or video data having the same content as that of the edited data shown in FIG. 13B.

For example, as shown in FIG. 13A, the audio and/or video data A to D are recorded in the recording medium of the recording and reproduction apparatus 24. The occupied recording regions of the audio and/or video data A to D are for example the 100th block to 189th block, the 200th block to 269th block, the 300th block to 379th block, and the 400th block to 469th block, respectively.

The audio and/or video apparatus $4_i$ carries out the editing by using the audio and/or video data A to D shown in FIG. 13A as the raw data, cuts the partial data from the 10th block to 49th block (data length: 40 blocks) from the head of the audio and/or video data A, from the 20th block to 24th block (data length: 5 blocks) from the head of the audio and/or video data B, from the 30th block to 69th block (data length: 40 blocks) from the head of the audio and/or video data C, and from the 20th block to 24th block (data length: 5 blocks) from the head of the audio and/or video data D and generates the edited data having the content shown in FIG. 13B.

When recording this edited data in the recording and reproduction apparatus 24, the audio and/or video data having the same content is recorded in an overlapping manner and waste occurs, therefore the audio and/or video apparatus $4_i$ outputs the editing data shown in FIG. 14 to the input/output control device $38_i$ of the audio and/or video data recording and reproduction apparatus 3.

As shown in FIG. 14, as the editing data, the file name of each of the partial data and the reproduction start position and the reproduction ending position in each of the management data are recorded. For example, the editing data for reproducing the audio and/or video data having the same content as that of the edited data shown in FIG. 13B becomes the content shown in FIG. 15 and FIG. 16.

The input/output control device $38_i$ calculates the recording regions occupied by the partial data (partial data A to D) of the audio and/or video data A to D contained in the edited data in the recording medium of the recording and reproduction apparatus 24 in the following format based on the editing data and the file entry and the record entry (refer to FIG. 6B and FIG. 6C) for the audio and/or video data A to C generated by the data managing device 34. Further, the input/output control device $38_i$ designates the calculated recording regions in the recording and reproduction apparatus 24 and makes the recording and reproduction apparatus 24 reproduce the partial data A to D from each of the designated recording regions in the order indicated by the editing data.

By changing the operation of the input/output control device $38_i$ of the audio and/or video data recording and reproduction apparatus 3 as described above, the edited data comprised by parts of the raw data (partial data) recorded in the recording and reproduction apparatus 24 is not further recorded in the recording and reproduction apparatus 24 overlapping on the raw data and the audio and/or video data the same as the edited data can be reproduced. Accordingly, in the audio and/or video data recording and reproduction apparatus 3 shown in the third embodiment, the recording capacity of the recording and reproduction apparatus 24 does not become wasted and the editing of audio and/or video data spanning a long period of time by the audio and/or video apparatus $4_i$ becomes possible.

Note that, it is also possible to configure the audio and/or video data recording and reproduction apparatus 3 so as to use it for just one of the video data or the audio data.

Further, so far as the same function and performance can be realized, there is no problem if the component parts of the audio and/or video data recording and reproduction apparatus 3 are constituted in the form of software or constituted in the form of hardware.

Further, the component parts of the audio and/or video data recording and reproduction apparatus 3 can be replaced by other means having equivalent function and performances.

Fourth Embodiment

Below, a fourth embodiment of the present invention will be explained.

According to the method of managing recording regions by the input/output control device $38_i$ of the audio and/or video data recording and reproduction apparatus 3 shown in the third embodiment, a predetermined effect, i.e., the effective utilization of the recording capacity of the recording and reproduction apparatus 24, can be achieved, but the editing data is recorded in the RAM 384 of the input/output control device $38_i$ (FIG. 8) in the form not changed from the receiving state from the audio and/or video apparatus $4_i$ and is converted to the data indicating the recording regions of the partial data at the time of reproduction, therefore there is a problem of a long processing time. Further, it is not seen which data among the raw data recorded in the recording and reproduction apparatus 24 is to be used as the raw data until the content of the editing data is analyzed and therefore a situation where the data is deleted irrespective of the fact that it is to be used as the raw data may occur.

In order to solve such a problem, in the audio and/or video data recording and reproduction apparatus 3 shown in the fourth embodiment, the content of the ROM 342 of the input/output control device $38_i$ is changed, and the input/output control device $38_i$ generates the reproduction entry of a linked list format indicating the recording regions of the partial data contained in the same edited data in advance based on the file entry and record entry received from the data managing device 34 (refer to FIG. 6B and FIG. 6C, and FIG. 7A and FIG. 7B) and the editing data input from the audio and/or video apparatus $4_i$ and outputs the same to the data managing device 34. The data managing device 34 stores the input reproduction entry in the RAM 344 and further records the same in the management data recording device 36.

Further, the input/output control device $38_i$ requests the reproduction entry of the edited data for which the reproduction was requested to the data managing device 34 where the reproduction of any edited data is requested from the audio and/or video apparatus $4_i$ and receives the reproduction entry from the data managing device 34. The input/output control device $38_i$ designates the recording regions indicated by the received reproduction entry in the recording and reproduction apparatus 24 and controls the recording and reproduction apparatus 24 to make it reproduce the partial data from the designated recording regions in the order indicated by the editing data, thereby to enable the quick reproduction of the audio and/or video data having the same content as that of the edited data.

Further, similar to the second embodiment, the data managing device 34 of the audio and/or video data recording and reproduction apparatus 3 adds the identification flag (delete enable flag) to the record entry and the reproduction entry and checks this delete enable flag when the recording region is deleted, thereby to prevent the raw data from being carelessly deleted.

Note that, the component parts other than the contents of the ROM 382 of the input/output control device $38_i$ of the audio and/or video data recording and reproduction apparatus 3 and the ROM 342 of the data managing device 34 in the fourth embodiment are the same as those of the third embodiment.

Below, this will be explained by a concrete example.

FIG. 17A to FIG. 17C are views illustrating the editing data used for reproducing the file entry and record entry of the audio and/or video data (raw data) A to B shown in FIG. 13A and the edited data shown in FIG. 13B and the reproduction entry generated by the processing of the data managing device 34 in the fourth embodiment.

As shown in FIG. 17A, the data managing device 34 generates the file entry and record entry of each of the audio and/or video data A to D based on the audio and/or video data A to D shown in FIG. 13A0 stores them in the ROM 342, and further records them in the management data recording device 36.

In this state, the audio and/or video apparatus $4_i$ outputs the editing data (same as that in FIG. 15) shown in FIG. 17C to the input/output control device $38_i$ so as to generate the same audio and/or video data as the edited data shown in FIG. 13B.

This editing data indicates that the partial data in a range from the 10th block to 49th block of the management data A, the partial data in a range from the 20th block to 24th block of the raw data B, the partial data in a range from the 30th block to 69th block of the management data C, and the partial data in a range from the 20th block to 24th block of the management data D are contained in the edited data X in this order.

The input/output control device $38_i$ requests the record entry and the file entry of the audio and/or video data A to D contained in the input editing data to the data managing device 34. The data managing device 34 outputs the record entry and the file entry of the audio and/or video data to the input/output control device $38_i$ in accordance with this request.

The input/output control device $38_i$ receiving the file entry and the record entry of the audio and/or video data A to D from the data managing device 34 generates a reproduction entry (FIG. 17C) of a linked list format indicating the occupied recording regions of the partial data A to D in the recording medium of the recording and reproduction apparatus 24 by linkage based on the editing data and received file entry and record entry and outputs the same to the data managing device 34. The data managing device 34 stores the input reproduction entry in the RAM 344 and further records this in the management data recording device 36.

Note that, the partial data contained in the edited data is the same as in the third embodiment, so the reproduction entry shown in FIG. 17C has the same content as that of FIG. 16 shown in the third embodiment.

Where the edited data X is reproduced, the audio and/or video apparatus $4_i$ outputs the input/output control signal requesting the reproduction of the edited data X to the input/output control device $38_i$. The input/output control device $38_i$ outputs the input input/output control signal to the data managing device 34. The data managing device 34 outputs the reproduction entry of the edited data X for which the reproduction was requested to the input/output control device $38_i$.

The input/output control device $38_i$ designates the recording regions of the recording medium indicated by the reproduction entry to the recording and reproduction apparatus 24 based on the reproduction entry received from the data managing device 34 and makes it reproduce the partial data A to D from the designated recording regions in the order indicated by the editing data.

As shown in the third embodiment, in comparison with a case where the editing data is stored in the RAM 384 of the input/output control device $38_i$ as it is and the recording regions of the partial data are calculated at the time of reproduction as shown in the third embodiment, as shown in the fourth embodiment, if the reproduction entry is generated in the form of the linked list shown in FIG. 17C in advance and stored in the RAM 344 of the data managing device 34, the calculation of the recording regions of the partial data at the time of reproduction becomes unnecessary and the audio and/or video data having the same content as that of the edited data can be quickly reproduced.

Further, all of the reproduction entries generated by the input/output control devices $38_1$ to $38_n$ are managed by the data managing device 34 together, so the reproduction entry generated by any of the input/output control devices $38_1$ to $38_n$ can be shared by all of the input/output control devices $38_1$ and $38_n$.

Note that, as illustrated in FIG. 13A and FIG. 13B, in a case where the partial data is divided into no more than four blocks, the time for calculation of the recording regions of the partial data at the reproduction din the rearticularly become an obstacle in the reproduction, but the larger the number of the divisions of the partial data, the longer the calculation processing time and the greater the possibility of obstruction of the reproduction. Accordingly, where the editing data of the edited data containing a lot of partial data is input to the input/output control device $38_i$ from the audio and/or video apparatus $4_i$, the merit of generating the reproduction entry in advance becomes large.

Below, the operation of the audio and/or video data recording and reproduction apparatus 3 of the fourth embodiment will be explained.

Figure 18:
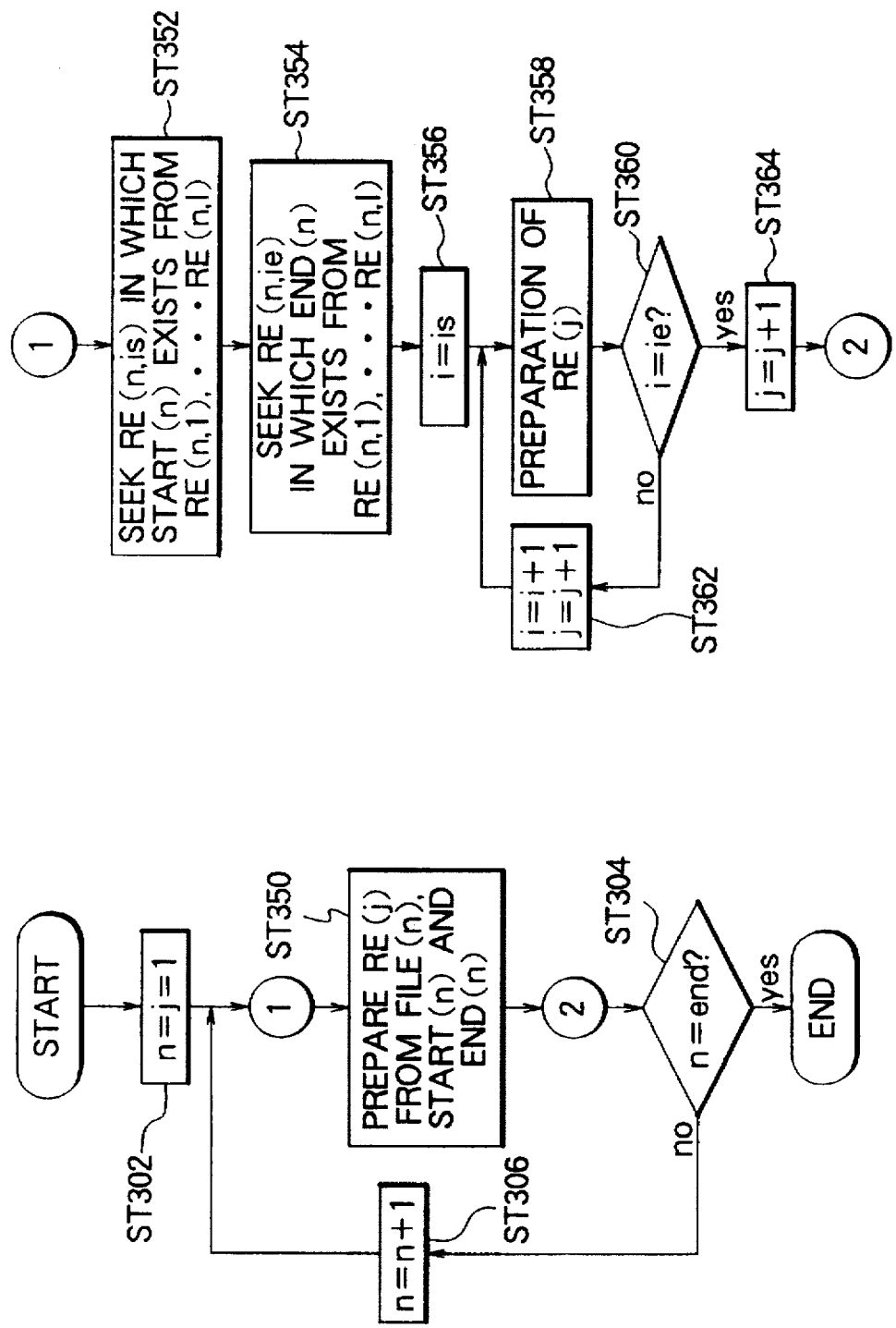
FIG. 18 is a flow chart of a processing for generating the reproduction entry by the data managing device shown in FIG. 4.

FIG. 18 is a flow chart showing the processing for generating the reproduction entry by the data managing device 34 shown in FIG. 4.

FIG. 19A to FIG. 19C are views of the editing data relating to the generation of the reproduction entry, the file entry and record entry, and the reproduction entry obtained as the result of the generation of the reproduction entry.

As shown in FIG. 18, at step 302 (ST302), a numerical value 1 is assigned to the variables n and j. The variable n is used for searching for the editing data shown in FIG. 19A and the record entry shown in FIG. 19B, and the variable j is used for searching for the reproduction entry shown in FIG. 19C.

At step 350 (ST350), the input/output control device $38_i$ generates the reproduction entry (RE(j)) of FIG. 19C) from the file name (FILE(n)) of FIG. 19A) contained in the editing data, a reproduction starting position (START(n)) of FIG. 19A), reproduction ending position (END(n)) of FIG. 19A), and the file entry and record entry (RE(n, I)) of FIG. 19B) of the audio and/or video data which becomes the raw data received from the data managing device 34. The contents of processing are shown in ST352 to ST364.

At step 352 (ST352), the input/output control device $38_i$ searches for the record entry RE(n, is) of the raw data containing the reproduction starting position (START(n)) from the record entry RE(n, i) received from the data managing device 34.

At step 354 (ST354), the input/output control device $38_i$ searches for the record entry RE(n, ie) of the raw data containing the reproduction ending position (END(n)) from the record entry RE(n, i) received from the data managing device 34.

At step 356 (ST356), the input/output control device $38_i$ assigns the numerical value "is" to the variable i.

At step 358 (ST358), the input/output control device $38_i$ generates the reproduction entry RE(j).

At step 360 (ST360), the input/output control device $38_i$ decides whether or not the reproduction ending position exists in the same record entry, that is, whether or not the variable i is the numerical value "is". Where the variable i is the numerical value "is", it proceeds to the processing of ST364, while where the variable i is not the numerical value "is", it proceeds to the processing of ST362.

At step 362 (ST362), the input/output control device $38_i$ adds the numerical value 1 to the variables i and j (increments the variables i and j).

At step 364 (ST364), the input/output control device $38_i$ increments the variable j and proceeds to the processing of ST304.

At step 304 (ST304), the input/output control device $38_i$ decides whether or not the variable n is the numerical value "end". Where the variable n is the numerical value "end", it outputs the generated reproduction entry to the data managing device 34 and ends the processing, while where the variable n is not the numerical value "end", proceeds to the processing of ST306.

At step 306 (ST306), the input/output control device $38_i$ increments the variable n and proceeds to the processing of ST350.

As mentioned above in the fourth embodiment, by changing the processing content of the input/output control device $38_i$ of the audio and/or video data recording and reproduction apparatus 3 and the data managing device 34, the audio and/or video data having the same content as that of the edited data can be reproduced without a necessity of recording the edited data in the recording and reproduction apparatus 24. In addition, the reproduction entry is generated in advance and the reproduction is carried out based on this reproduction entry, so the processing time for calculating the recording regions of the partial data shown in the third embodiment becomes unnecessary. Accordingly, the processing time for this calculation of recording regions does not become an obstacle in the reproduction.

In addition, the processing for generation of the reproduction entry shown in the fourth embodiment is only the writing of the storage content of the ROM 382 of the input/output control device $38_i$ and the ROM 342 of the data managing device 34. It is not necessary to make any change to the hardware of the audio and/or video data recording and reproduction apparatus 3 shown in the third embodiment.

Note that, needless to say, the audio and/or video data recording and reproduction apparatus 3 according to the invention not only can generate the reproduction entry from four series of raw data, but also can generate a reproduction entry for reproducing the audio and/or video data having the same content as that of the edited data by combining partial data of five or more series of raw data.

Further, the algorithm of the control system 10 shown in the fourth embodiment and a signal sequence between the audio and/or video apparatus $4_i$ and the control system are examples. So far as the same function and performance can be realized, other algorithms and signal sequences can be adopted.

Further, it is possible to make modifications similar to that of the third embodiment to the audio and/or video data recording and reproduction apparatus 3 shown in the fourth embodiment as well.

Fifth Embodiment

Below, a fifth embodiment of the present invention will be explained.

FIG. 20A to FIG. 20D are views of the operation of the input/output control device $38_i$ of the audio and/or video data recording and reproduction apparatus 3 and the data managing device 34 (FIG. 4) in the fifth embodiment. Note, in the fifth embodiment, the data length of one block is for example 10 Mbytes.

For example, where the audio and/or video apparatus $4_i$ edits the partial data A to D (FIG. 20B) having data lengths of 40 blocks, 5 blocks, 40 blocks, and 5 blocks, contained in the raw data A to D shown in FIG. 13A in the third embodiment and obtains the edited data shown in FIG. 13B, the editing data shown in FIG. 17B in the fourth embodiment in input to the input/output control device $38_i$ of the audio and/or video data recording and reproduction apparatus 3 from the audio and/or video apparatus $4_i$.

When the input/output control device $38_i$ of the audio and/or video data recording and reproduction apparatus 3 shown in the fourth embodiment carries out the processing based on this editing data and the record entry of the raw data A to D shown in FIG. 17A, the reproduction entry of the edited data X shown in FIG. 17C is obtained.

However, the data length of the partial data (partial data B and D) of the raw data B and D has become as short as 5 blocks. When reproducing the audio and/or video data having the same content as that of such an edited data, the last part of each of the partial data A and C and the starting part of each of the partial data B and D are recorded in separated recording regions on the recording medium of the recording and reproduction apparatus 24, therefore access to the distant recording regions of the recording medium of the recording and reproduction apparatus 24 and a wait for rotation become necessary at the end of reproduction of the partial data B and D. On the other hand, each of the partial data B and D has a small data length such as 5 MB, so there is a possibility that the buffer memory 222 (FIG. 8) of the input/output control device $38_i$ will suffer from underflow within a time required for the access and wait for rotation. When underflow occurs in the buffer memory 222, continuous reproduction becomes impossible.

The audio and/or video data recording and reproduction apparatus 3 in the fifth embodiment is aimed at the solution of such a problem.

In order to continuously reproduce partial data having a short data length that may cause an underflow of the buffer memory 222, the input/output control device $38_i$ in the fifth embodiment analyzes the editing data (FIG. 17B) received from the audio and/or video apparatus $4_i$, continuously records the short partial data and this short partial data in the predetermined recording regions of the recording medium of the recording and reproduction apparatus 24 in advance, obtains a data length not causing the underflow in the buffer memory 222, and thereby avoids the above inconvenience.

Note that, the operation of the input/output control device $38_i$ of the audio and/or video data recording and reproduction apparatus 3 in the fifth embodiment, that is, the component parts other than the storage content of the ROM 382 of the input/output control device $38_i$, are the same as the component parts of the audio and/or video data recording and reproduction apparatus 3 in the fourth embodiment.

Below, the processing of the input/output control device $38_i$ of the audio and/or video data recording and reproduction apparatus 3 in the fifth embodiment will be briefly explained by a concrete example.

Figure 20A:
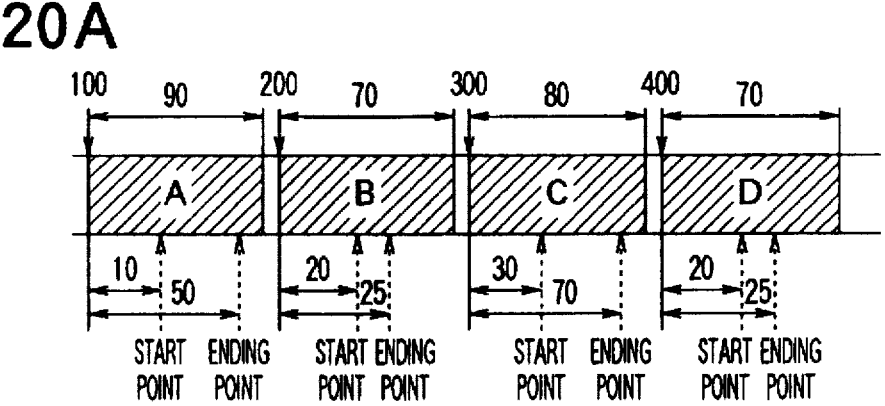
FIG. 20A to FIG. 20D are views of the operation of the input/output control device of the audio and/or video data recording and reproduction apparatus and the data managing device (FIG. 4) in the fifth embodiment.
Figure 20B:

As mentioned above, among the raw data A to D (FIG. 20A) recorded in the 100th block to 189th block, the 200th block to 269th block, the 300th block to 379th block, and the 400th block to 469th block of the recording medium of the recording and reproduction apparatus 24, the 110th block to 149th block (data length: 40 blocks), the 220th block to 224th block (data length: 5 blocks), the 330th block to 369th block (data length: 40 blocks), and the 420th block to 424th block (data length: 5 blocks) are contained in the edited data as the partial data A to D (FIG. 20B).

For example, where there is a possibility of occurrence of underflow in the buffer memory 222 (FIG. 8) due to a data length being 10 blocks or less, there is a possibility that continuous reproduction can no longer be carried out when reproducing the partial data B and D. On the other hand, as shown in FIG. 20B, even if the partial data A and C are divided into partial data A' and C' having a data length of 35 blocks and the partial data a and o having the data length of 5 blocks, when reproducing the partial data A', continuous reproduction is possible without an obstacle.

Figure 20C:
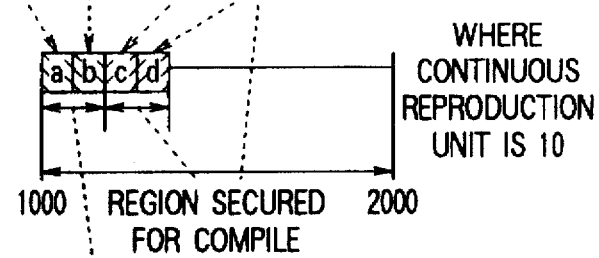

By utilizing this point, the input/output control device $38_i$ in the fifth embodiment controls the control system 20, places the partial data a and c in front of the short partial data B and D as shown in FIG. 20C to obtain the partial data ab and cd having the data length of 10 blocks, and records them in advance in the predetermined recording regions (for example 1000th block to 2000th block; compile recording region) of the recording medium of the recording and reproduction apparatus 24.

Figure 20D:
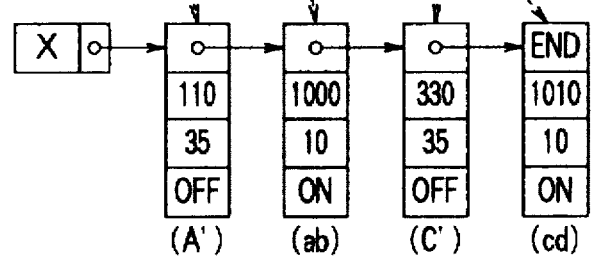

Further, as shown in FIG. 20D, for the partial data A', ab, C', and cd, it generates the same reproduction entry as that of the fourth embodiment and outputs this to the data managing device 34. The data managing device 34 stores this reproduction entry in the RAM 344 and further records this in the management data recording device 36.

Where the reproduction of the edited data shown in FIG. 13B is requested to any of the input/output control devices $38_1$ to $38_n$ from the audio and/or video apparatus $4_i$, that one device of the input/output control devices $38_1$ to $38_n$ receiving the request requests the reproduction entry of the edited data for which the reproduction was requested to the data managing device 34. The data managing device 34 outputs the reproduction entry to the one device of the input/output control devices $38_1$ to $38_n$ requesting the reproduction entry in accordance with this request. The one device of the input/output control devices $38_1$ to $38_n$ receiving the reproduction entry reproduces the audio and/or video data the same as the edited data based on the received reproduction entry.

In this way, by recording the partial data having an amount that does not cause underflow in the buffer memory 222 in the compile recording region in advance, further generating the reproduction entry through the partial data recorded in the usual recording regions and the partial data recorded in the compile recording region, and reproducing the partial data A', ab, C', and cd from the recording and reproduction apparatus 24 based on the reproduction entry shown in FIG. 20D in accordance with the request of the audio and/or video apparatus $4_i$, in addition to the effect of the quick reproduction of the audio and/or video data recording and reproduction apparatus 3 shown in the fourth embodiment, further continuous reproduction of the audio and/or video data the same as the edited data can be guaranteed.

Here, as shown in FIG. 20D, the value of the delete enable flag of the partial data recorded in the compile recording region is made ON and the value of the delete enable flag of the other partial data is made OFF. The reason why the delete enable flag is brought to the value shown in FIG. 20D is that, even if the data recorded in the compile recording region is deleted, the original raw data is recorded in the recording and reproduction apparatus 24, so it will not be lost.

Note that, where the data length of the partial data A and C is less than 15 blocks, continuous reproduction can be guaranteed by adding the partial data B and D to the partial data A and C, recording the same in the compile recording region, and then generating the reproduction entry.

Further, even if the partial data A and C and the partial data B and D are added, where the data length of each is less than 10 blocks, by further adding the partial data (not illustrated) before the partial data A to the partial data A and B, adding the partial data (not illustrated) after the partial data D to the partial data C and D, or continuously recording all of the partial data A to D in the compile recording region, the continuous reproduction can be guaranteed.

Further, even if not the partial data immediately before the current data, but part of the partial data immediately after the current data is added to the short partial data, the same effect can be obtained.

The processing for recording the above explained short partial data in the compile recording region in advance together with part or all of the partial data immediately before the current data will be referred to as the compile processing in the fifth embodiment.

Below, the content of the compile processing by the input/output control device $38_i$ in the fifth embodiment will be explained in detail.

Figure 21:
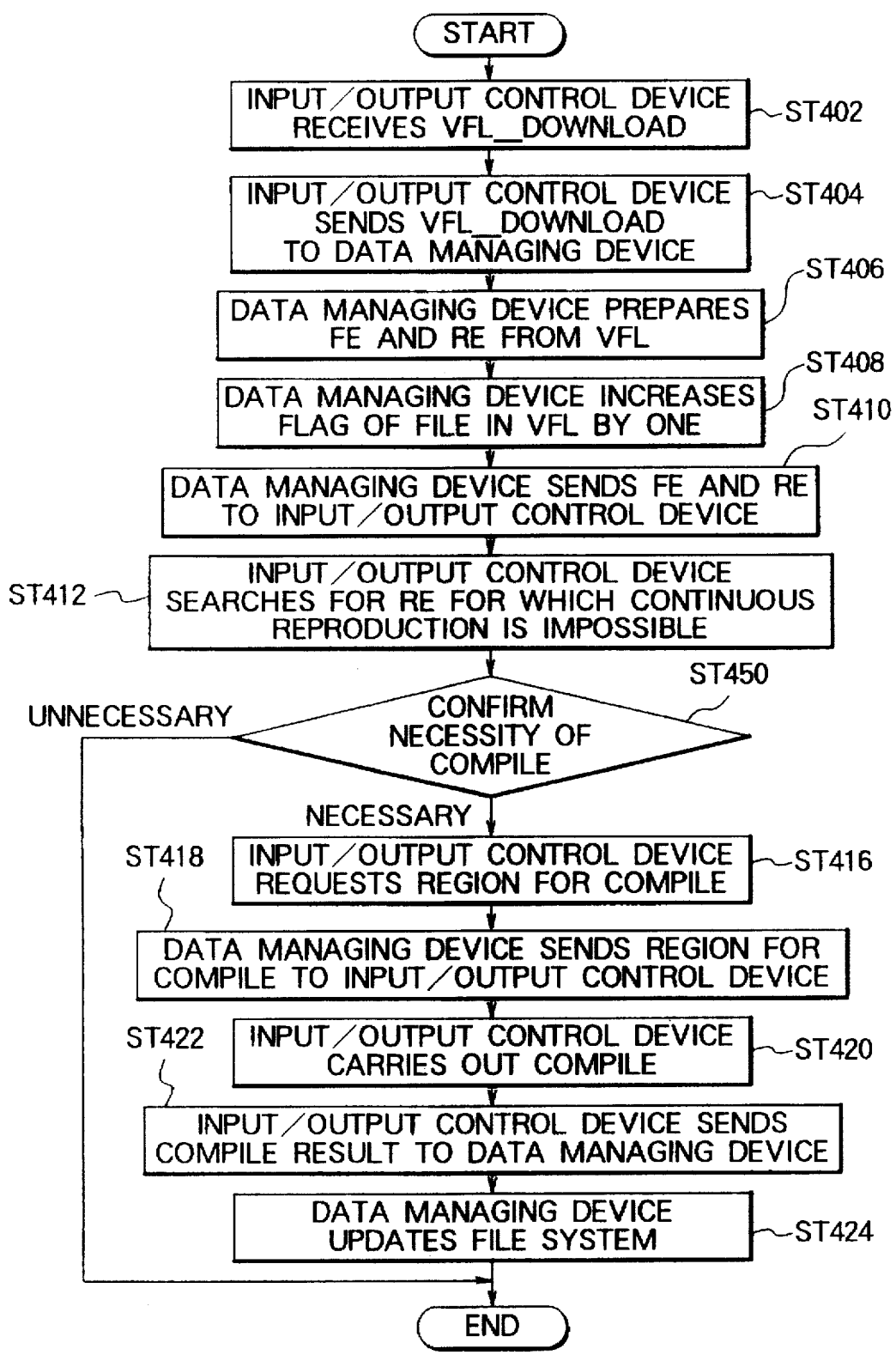
FIG. 21 is a flow chart of a compile processing carried out by the input/output control device of the audio and/or video data recording and reproduction apparatus in the fifth embodiment.

FIG. 21 is a flow chart showing the content of the compile processing carried out by the input/output control device $38_i$ of the audio and/or video data recording and reproduction apparatus 3 in the fifth embodiment.

Figure 22:
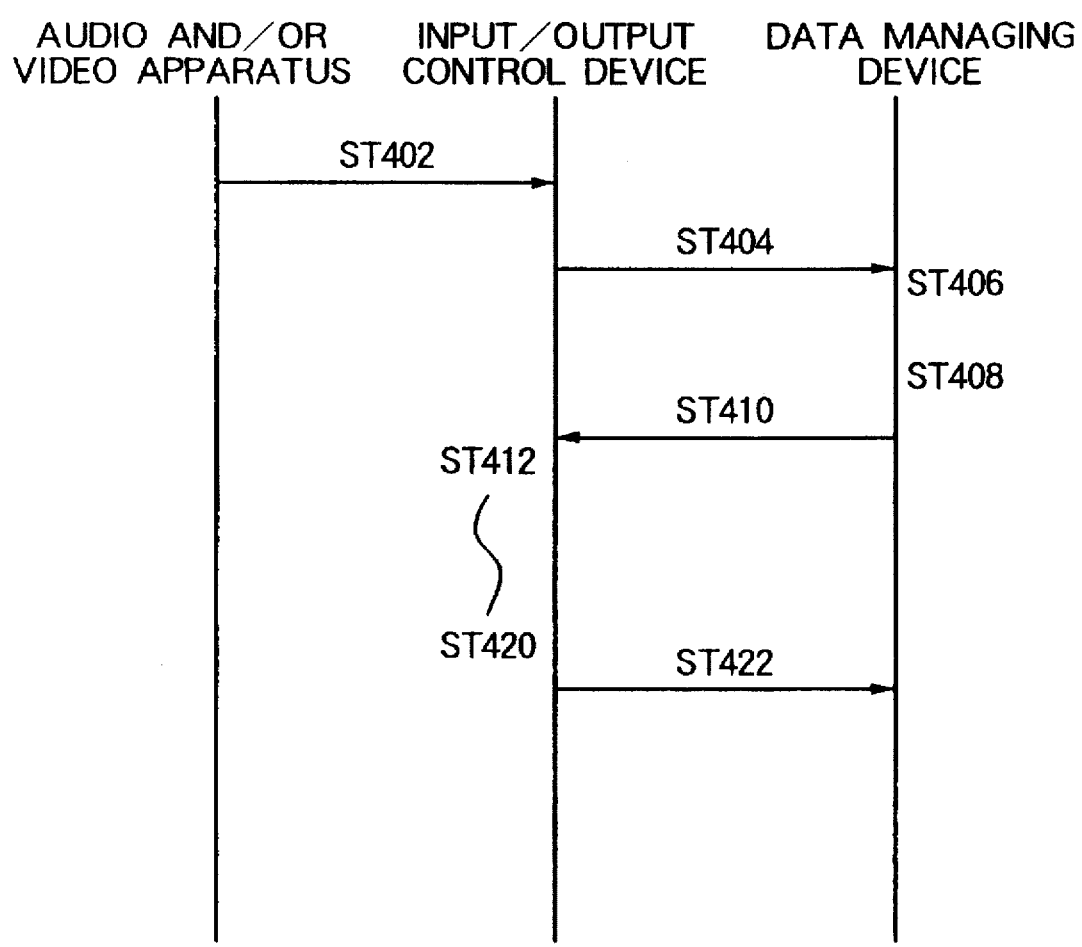
FIG. 22 is a signal sequence diagram of the signal sequence among the audio and/or video apparatus, input/output control device, and the data managing device when the input/output control device of the audio and/or video data recording and reproduction apparatus carries out the compile processing in the fifth embodiment.

FIG. 22 is a signal sequence diagram of the signal sequence among the audio and/or video apparatus $4_i$, the input/output control device $38_i$, and the data managing device 34 when the input/output control device $38_i$ of the audio and/or video data recording and reproduction apparatus 3 carries out the compile processing in the fifth embodiment.

Figure 23:
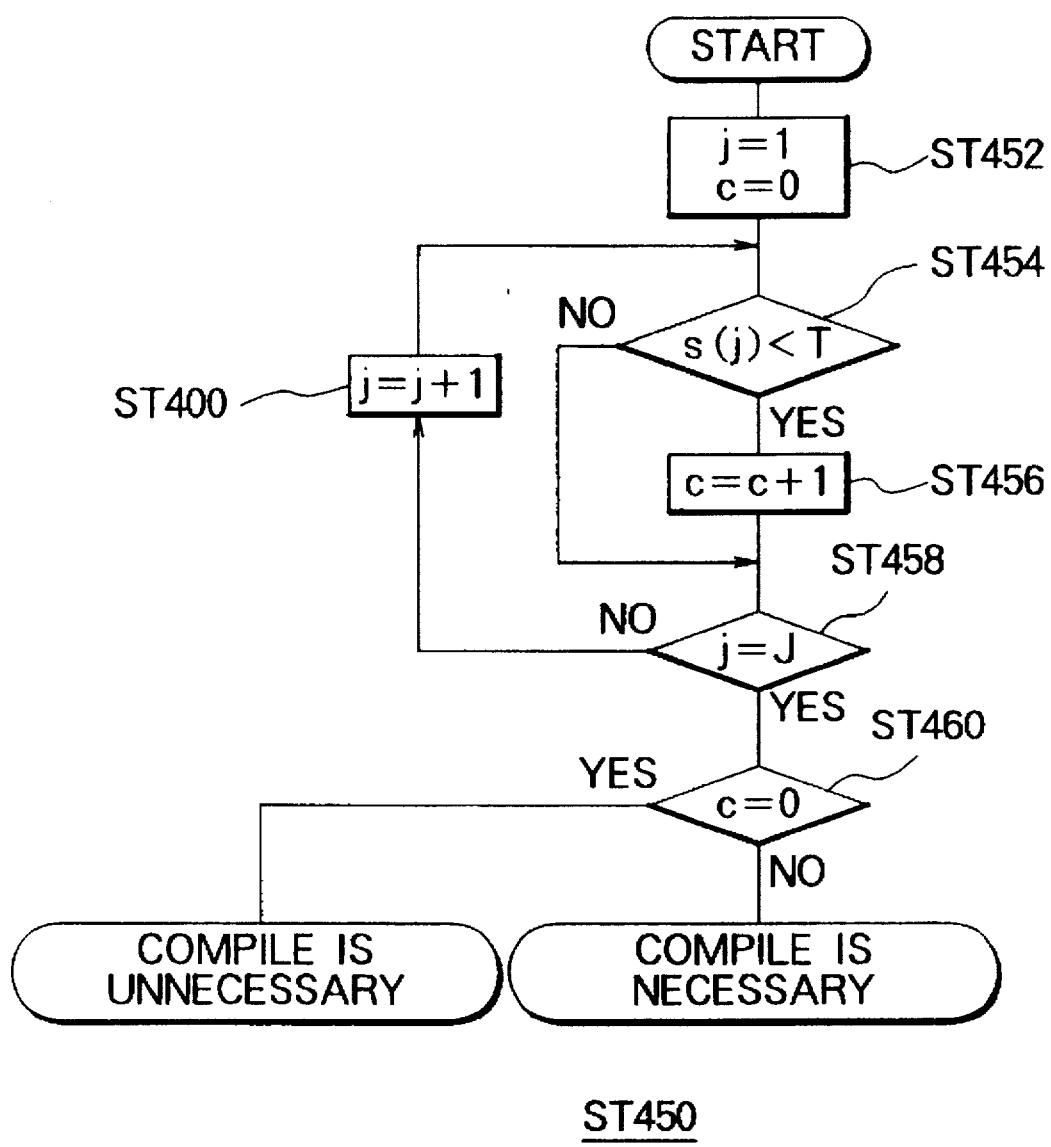
FIG. 23 is a flow chart of a processing content of ST450 shown in FIG. 21.

FIG. 23 is a flow chart showing the processing content of ST450 shown in FIG. 21.

Figure 24:
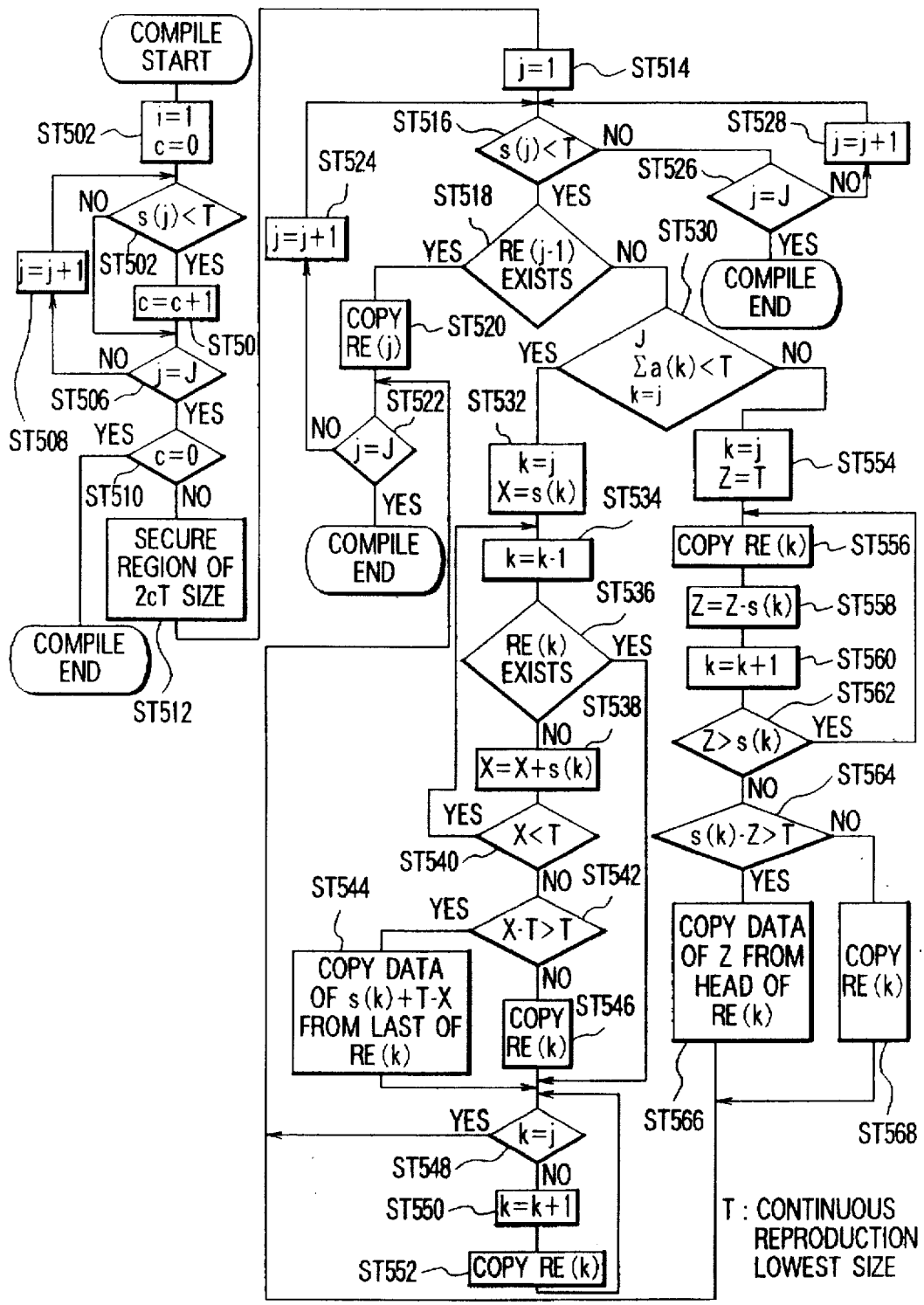
FIG. 24 is a flow chart of a compile processing carried out by the input/output control device of the audio and/or video data recording and reproduction apparatus in the fifth embodiment in further detail.

FIG. 24 is a flow chart showing the content of the compile processing carried out by the input/output control device $38_i$ of the audio and/or video data recording and reproduction apparatus 3 in the fifth embodiment in further detail.

As shown in FIG. 21 and FIG. 22, at step 402 (ST402), the audio and/or video apparatus $4_i$ outputs the command (VFL_DOWNLOAD command) containing the editing data (VFL: Virtual File List) for making the input/output control device $38_i$ receive the editing data to the input/output control device $38_i$. The input/output control device $38_i$ receives this VFL_DOWNLOAD command.

At step 404 (ST404), the input/output control device $38_i$ outputs the received VFL_DOWNLOAD command to the data managing device 34.

At step 406 (ST406) and step 408 (ST408), the data managing device 34 searches for the file entry (FE) and the record entry (RE) of the raw data containing the partial data contained in the edited data based on the editing data and generates the reproduction entry (FIG. 17C). Further, the data managing device 34 increments the delete enable flag of the record entry found as a result of the search to make the value of the delete enable flag OFF.

At step 410 (ST410), the data managing device 34 outputs the generated reproduction entry and the file entry and the record entry found as a result of the search to the input/output control device $38_i$.

At step 412 (ST412), the input/output control device $38_i$ analyzes the reproduction entry sent from the data managing device 34 and searches for the partial data having a short data length and thus unable to be continuously reproduced.

At step 450 (ST450), the input/output control device $38_i$ decides the necessity of the compile processing. The content of the processing regarding the decision of the necessity of the compile processing by the input/output control device $38_i$ is as shown in FIG. 23. Only in a case where the compile processing is necessary does the operation routine proceed to the processing of ST416.

At step 416 (ST416), the input/output control device $38_i$ requests the securing of the recording region (compile recording region) which becomes necessary for the compile processing to the data managing device 34. Note that, the data length of the compile recording region is 2cT or more when the partial data for which the continuous reproduction is impossible is determined to be the partial data having the data length T or less and the number of the series of the partial data for which the continuous reproduction is impossible is defined as c.

At step 418 (ST418), the data managing device 34 secures the compile recording region and notifies this to the input/output control device $38_i$.

At step 420 (ST420), the input/output control device $38_i$ carries out the compile processing (FIG. 20A to FIG. 20D). Note that, a detailed description of the content of the compile processing by the input/output control device $38_i$ is given in FIG. 24.

At step 422 (ST422), the input/output control device $38_i$ generates a new reproduction entry based on the result of the compile processing and outputs the same to the data managing device 34.

At step 424 (ST424), the data managing device 34 replaces the new reproduction entry received from the input/output control device $38_i$ by the reproduction entry prepared at the processing of ST406 and updates this.

Figure 25:
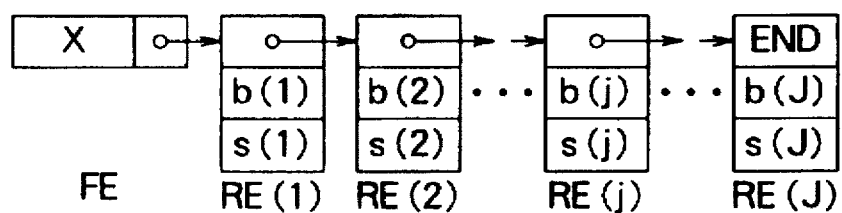
FIG. 25 is a view of the definition of the data b(k) and s(j) in the reproduction entry R(k) in the flow chart shown in FIG. 24.
Figure 26A:
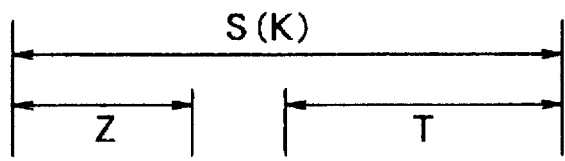
FIG. 26A and FIG. 26B are views defining variables Z and s(k) in the flow chart shown in FIG. 24.
Figure 26B:
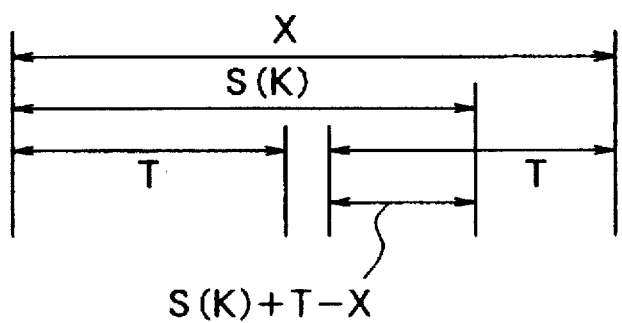

Note that, in the flow chart shown in FIG. 24, the data b(k) and s(j) in the reproduction entry R(k) is defined as shown in FIG. 25, variables Z and s(k) are defined as shown in FIG. 26A and FIG. 26B.

That is, the variable Z in ST566 in FIG. 24 indicates the data length of the data removed from the partial data immediately before the short partial data for obtaining the data having the data length T or more in addition to the short partial data as shown in FIG. 26A.

Further, the numerical value s(k)–T–X at ST544 in FIG. 24 indicates the data length of the data removed from the partial data immediately after the short partial data so as to obtain the data having the data length T or more in addition to the short partial data as shown in FIG. 26B.

As explained above, based on the generated reproduction entry, the reproduction data the same as the edited data requested from the audio and/or video apparatus $4_i$ can be reproduced, and in addition, the audio and/or video data recording and reproduction apparatus 3 shown in the fifth embodiment can continuously reproduce the audio and/or video data the same as the edited data quickly and in addition reliably similar to the audio and/or video data recording and reproduction apparatus 3 shown in the fourth embodiment.

Below, an explanation will be made of the processing where the audio and/or video apparatus $4_i$ requests the deletion of the audio and/or video data to the audio and/or video data recording and reproduction apparatus 3.

Figure 27:
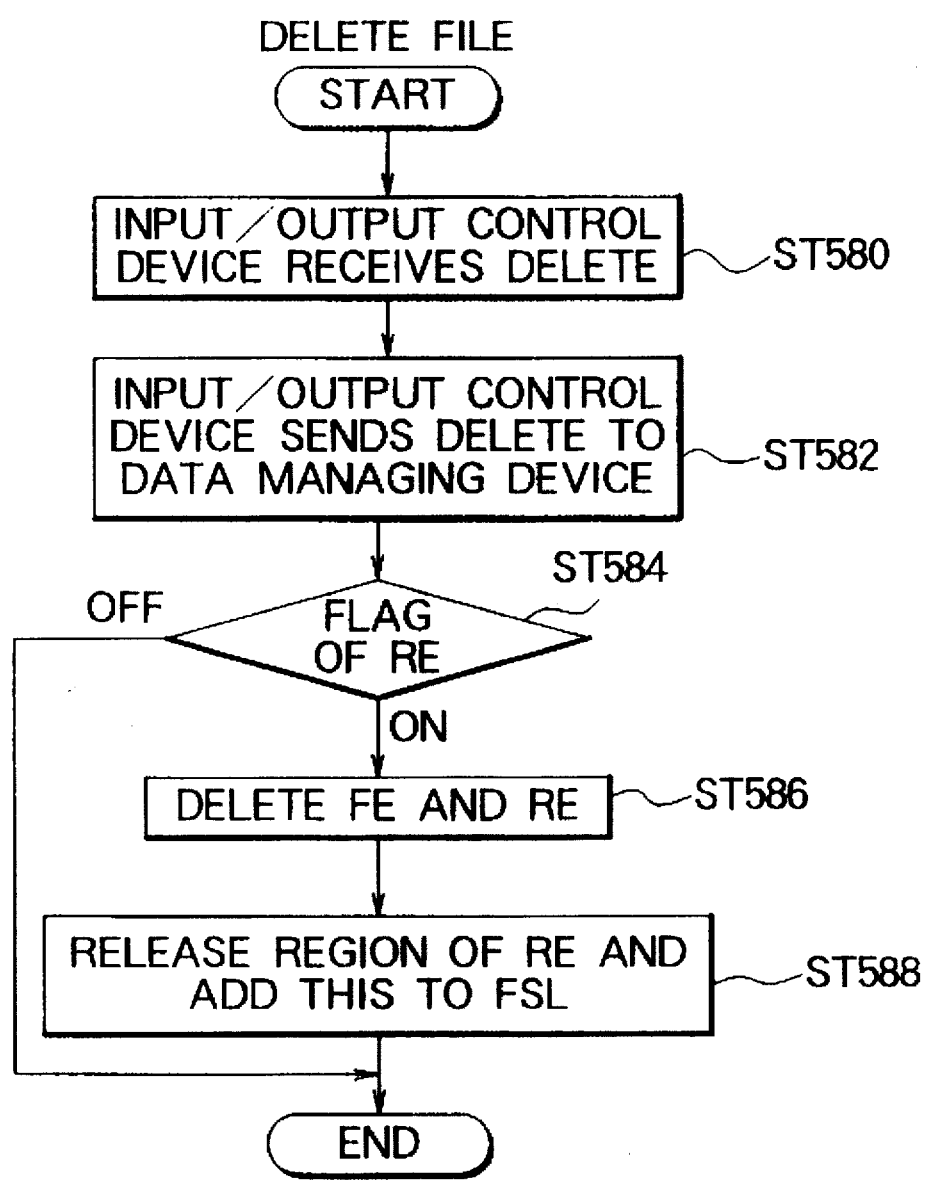
FIG. 27 is a flow chart of a processing of the input/output control device and the data managing device where the audio and/or video apparatus shown in FIG. 2 requests the deletion of the audio and/or video data at the audio and/or video data recording and reproduction apparatus.

FIG. 27 is a flow chart showing the processing of the input/output control device $38_i$ and the data managing device 34 where the audio and/or video apparatus $4_i$ shown in FIG. 2 requests the deletion of the audio and/or video data to the audio and/or video data recording and reproduction apparatus 3.

Figure 28:
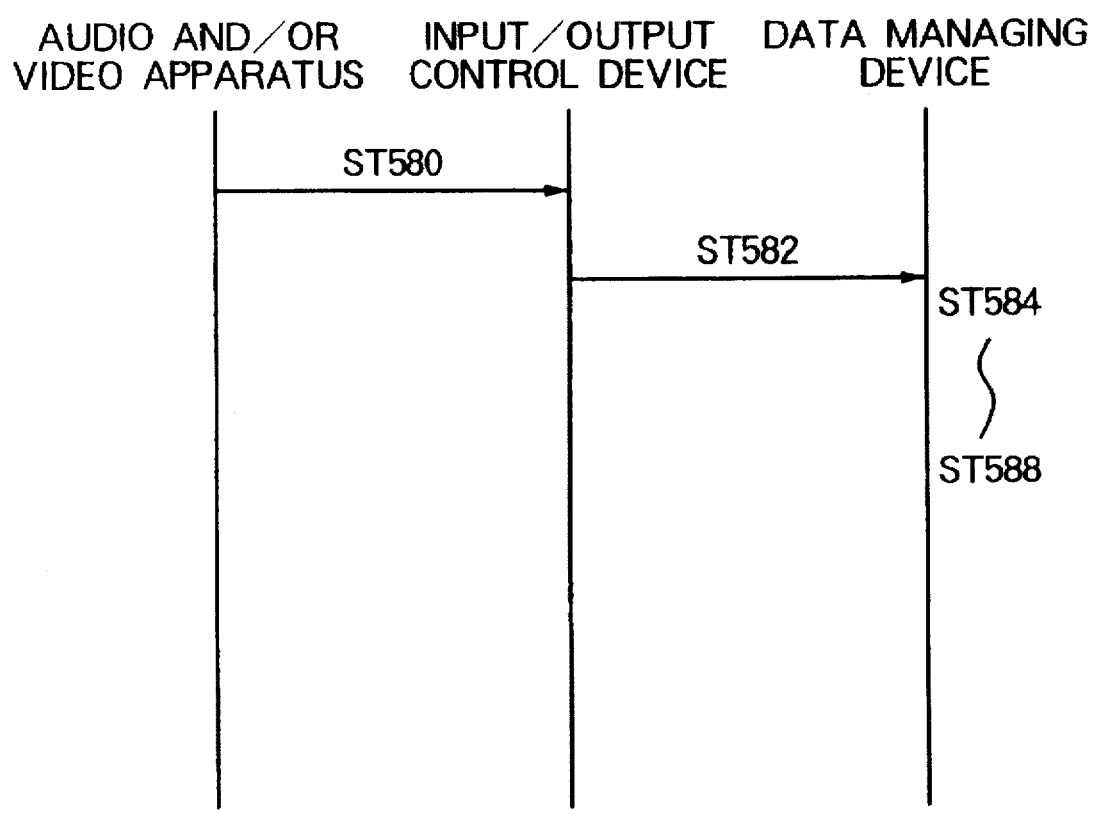
FIG. 28 is a signal sequence diagram of the signals transmitted and received among the audio and/or video apparatus, input/output control device, and the data managing device where the audio and/or video apparatus shown in FIG. 2 requests the deletion of the audio and/or video data to the audio and/or video data recording and reproduction apparatus.

FIG. 28 is a signal sequence diagram of the signals transmitted and received among the audio and/or video apparatus $4_i$, the input/output control device $38_i$, and the data managing device 34 where the audio and/or video apparatus $4_i$ shown in FIG. 2 requests the deletion of the audio and/or video data to the audio and/or video data recording and reproduction apparatus 3.

As shown in FIG. 27 and FIG. 28, at step 580 (ST580), the audio and/or video apparatus $4_i$ outputs the DELETE command for requesting the deletion of the audio and/or video data and containing the file name of the audio and/or video data for which the deletion is being requested to the input/output control device $38_i$. The input/output control device $38_i$ receives this DELETE command.

At step 582 (ST582), the input/output control device $38_i$ outputs the received DELETE command to the data managing device 34.

At step 584 (ST584), the data managing device 34 refers to the delete enable flag of the record entry (RE; reproduction entry) of the audio and/or video data for which the deletion was requested, proceeds to the processing of ST586 where the value is ON, and terminates the processing where the value is OFF.

At step 586 (ST586) and step 588 (ST588), the data managing device 34 deletes the file entry (FE) and the record entry (RE) and adds them to the free space list.

Below, an explanation will be made of the processing in the case where the audio and/or video apparatus $4_i$ requests the deletion of the audio and/or video data to the audio and/or video data recording and reproduction apparatus 3.

Figure 29:
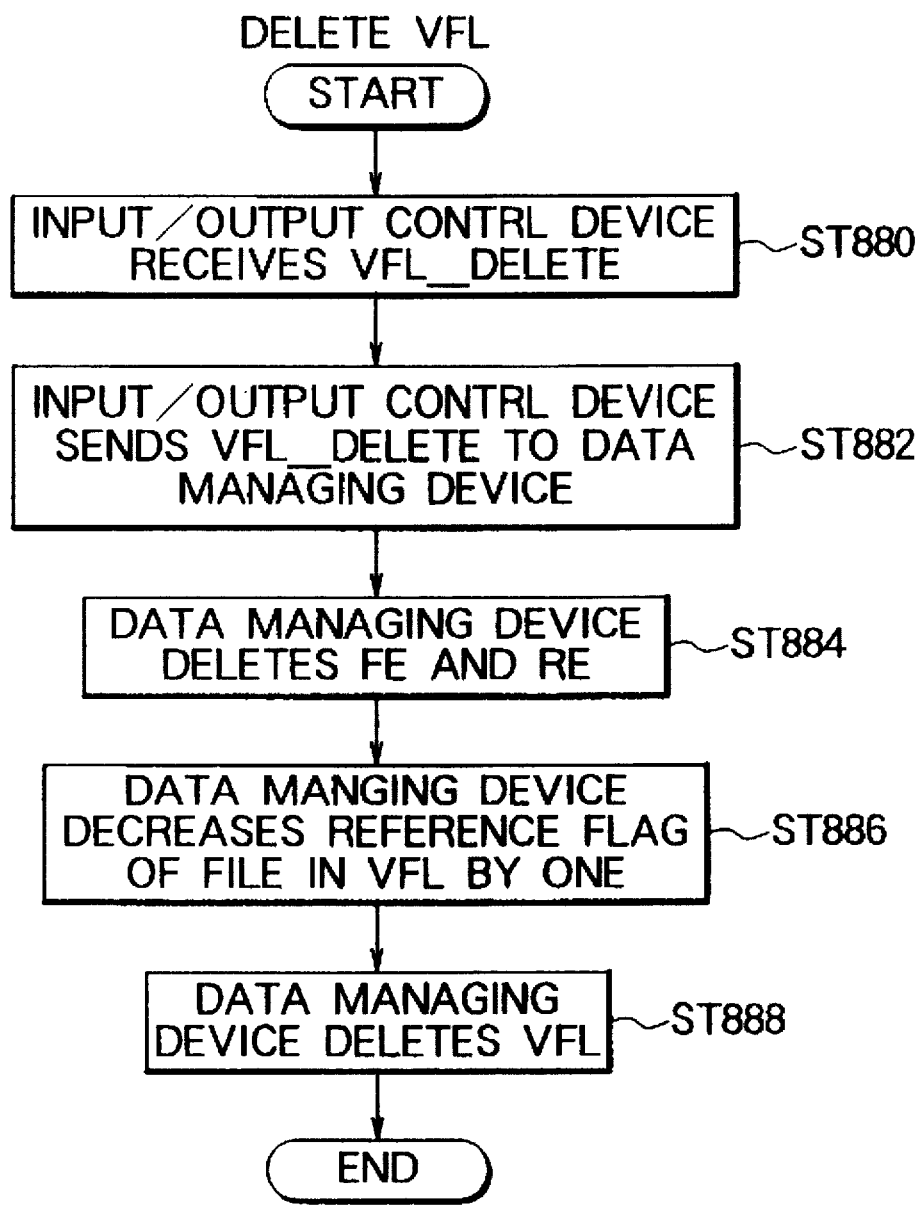
FIG. 29 is a flow chart of a processing of the input/output control device and the data managing device where the audio and/or video apparatus shown in FIG. 2 requests the deletion of the reproduction entry (editing data) to the audio and/or video data recording and reproduction apparatus.

FIG. 29 is a flow chart showing the processing of the input/output control device $38_i$ and the data managing device 34 where the audio and/or video apparatus $4_i$ requests the deletion of the reproduction entry (editing data) to the audio and/or video data recording and reproduction apparatus 3.

Figure 30:
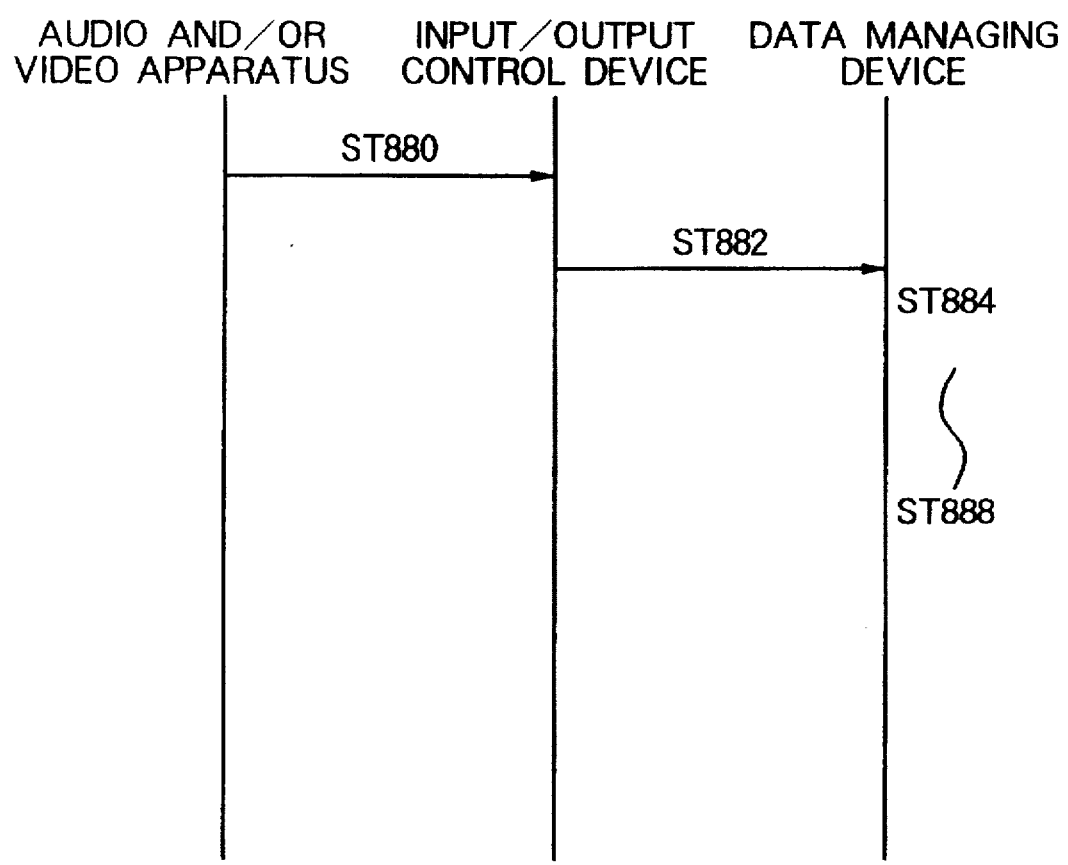
FIG. 30 is a signal sequence diagram of the signals transmitted and received among the audio and/or video apparatus, input/output control device, and the data managing device where the audio and/or video apparatus shown in FIG. 2 requests the deletion of the reproduction entry (editing data) to the audio and/or video data recording and reproduction apparatus.

FIG. 30 is a signal sequence diagram of the signals transmitted and received among the audio and/or video apparatus $4_i$, the input/output control device $38_i$, and the data managing device 34 where the audio and/or video apparatus $4_i$ shown in FIG. 2 requests the deletion of the reproduction entry (editing data) to the audio and/or video data recording and reproduction apparatus 3.

As shown in FIG. 29 and FIG. 30, at step 880 (ST880), the audio and/or video apparatus $4_i$ outputs the VFL_DELETE command for requesting the deletion of the reproduction entry (editing data; VFL) and containing the file name of the edited data for which the deletion is being requested to the input/output control device $38_i$. The input/output control device $38_i$ receives this VFL_DELETE command.

At step 882 (ST882), the input/output control device $38_i$ outputs the received VFL_DELETE command to the data managing device 34.

At step 884 (ST884), the data managing device 34 deletes the file entry and the reproduction entry of the edited data.

At step 886 (ST886), the data managing device 34 subtracts the value of the delete enable flag of the reproduction entry by one.

At step 888 (ST888), the data managing device 34 deletes the editing data.

As explained above, according to the audio and/or video data recording and reproduction apparatus 3 shown in the fifth embodiment, even in a case where the audio and/or video data having the same content as that of the edited data is reproduced by combining the partial data having a variety of lengths, the continuity of the reproduced audio and/or video data is not degraded.

In addition, so as to realize the audio and/or video data recording and reproduction apparatus 3 shown in the fifth embodiment, it is sufficient so far as the storage contents of the ROM 382 of the input/output control devices $38_i$ of the audio and/or video data recording and reproduction apparatuses 3 shown in the fifth embodiment and the fourth embodiment are changed and the ROM 342 of the data managing device 34 is changed. No change in terms of hardware is necessary.

Note that, to the audio and/or video data recording and reproduction apparatus 3 shown in the fifth embodiment may be subjected to similar modifications as those with respect to the audio and/or video data recording and reproduction apparatus 3 shown in the third embodiment and the fourth embodiment.

Sixth Embodiment

Below, a sixth embodiment of the present invention will be explained.

In the fifth embodiment, the explanation was be made of a case where the input/output control device $38_i$ generated the reproduction entry, but in the sixth embodiment, an explanation will be made of the processing where the data managing device 34 generates the reproduction entry and carries out the compile processing.

Note that, the contents of the processing other than the generation of the reproduction entry and the compile processing of the reproduction entry of the input/output control device $38_i$ and the data managing device 34 are the same as those of the fifth embodiment.

Figure 31:
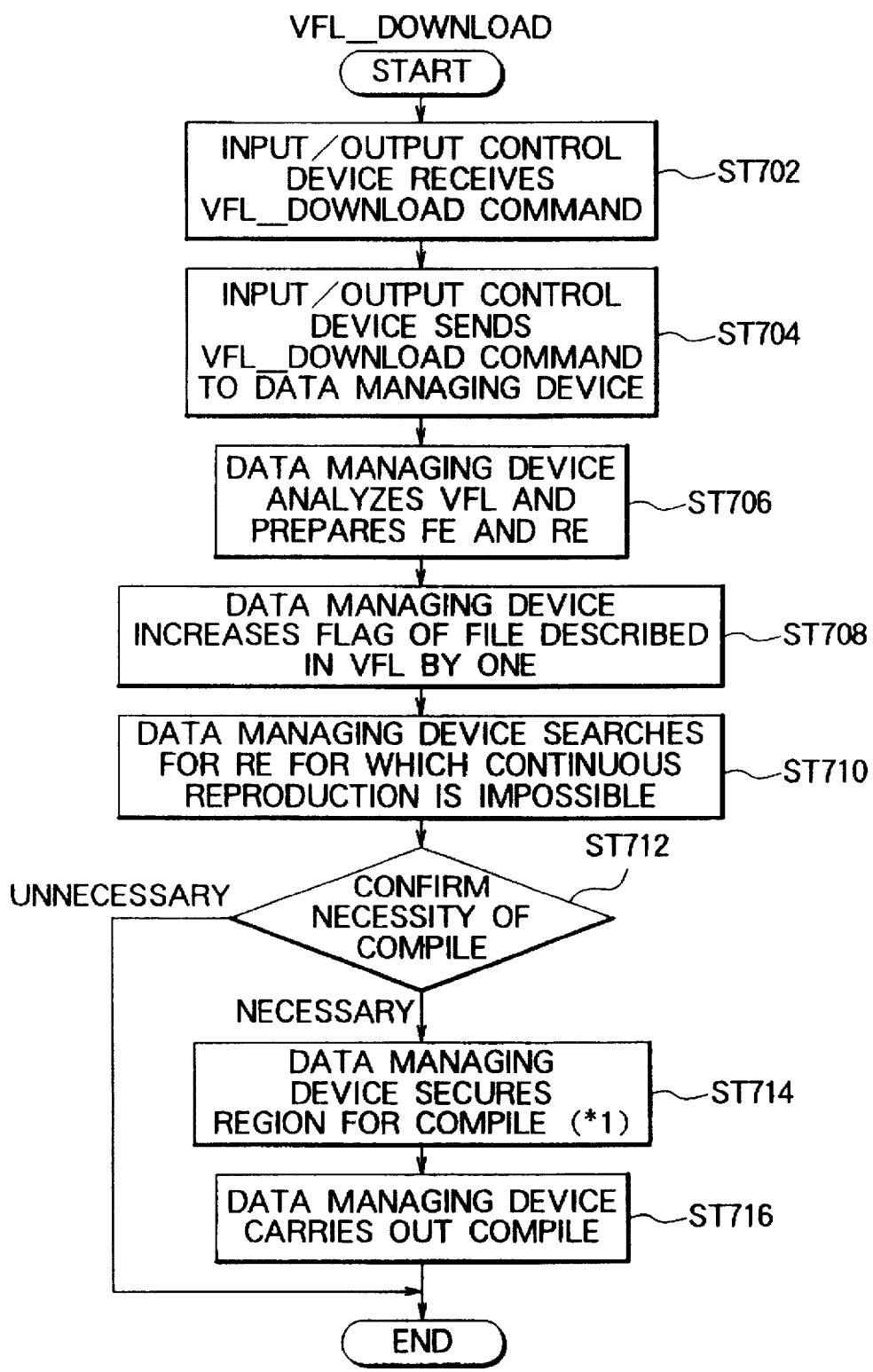
FIG. 31 is a flow chart of a compile processing carried out by the data managing device of the audio and/or video data recording and reproduction apparatus in the sixth embodiment.

FIG. 31 is a flow chart showing the content of the compile processing carried out by the data managing device 34 of the audio and/or video data recording and reproduction apparatus 3 in the sixth embodiment.

Figure 32:
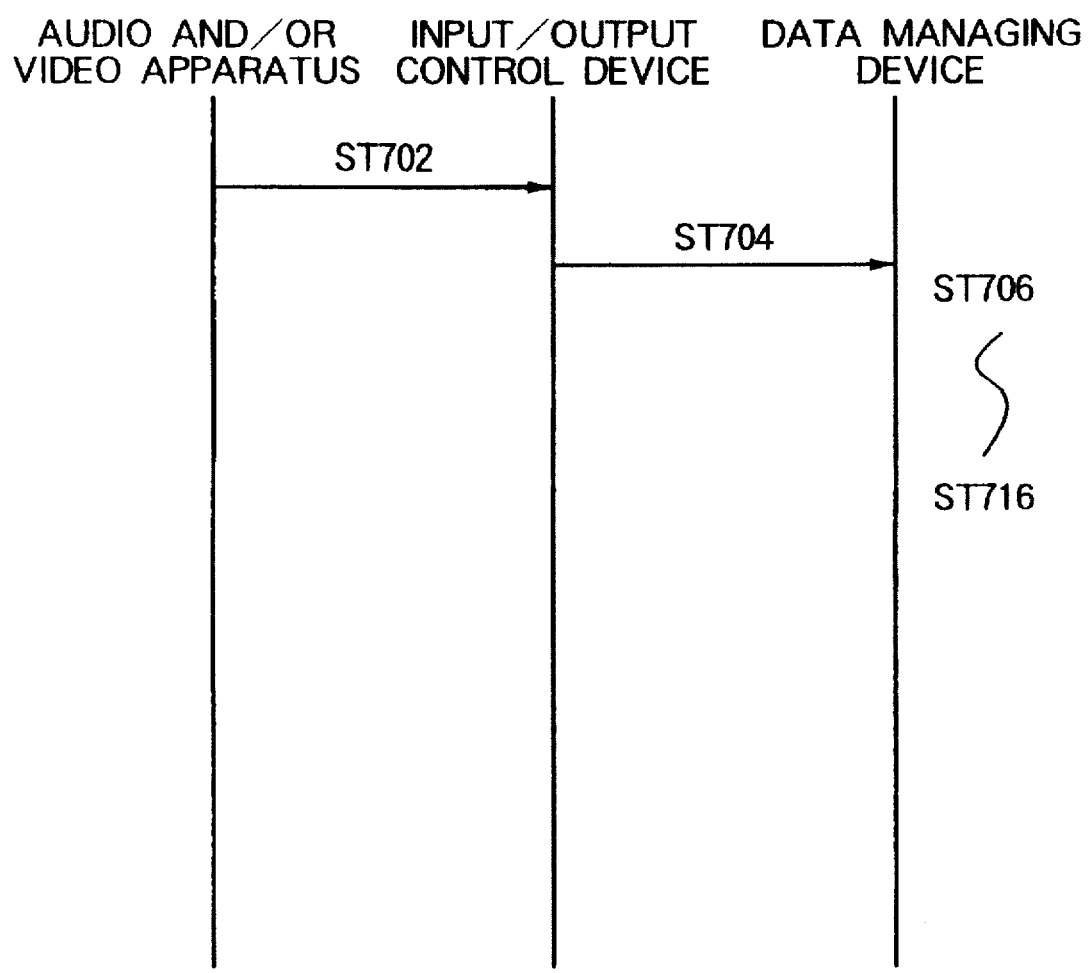
FIG. 32 is a signal sequence diagram of the signal sequence among the audio and/or video apparatus, input/output control device, and the data managing device when the data managing device of the audio and/or video data recording and reproduction apparatus carries out the compile processing in the sixth embodiment.

FIG. 32 is a signal sequence diagram of the signal sequence among the audio and/or video apparatus $4_i$, the input/output control device $38_i$, and the data managing device 34 when the data managing device 34 of the audio and/or video data recording and reproduction apparatus 3 carries out the compile processing in the sixth embodiment.

Figure 33:
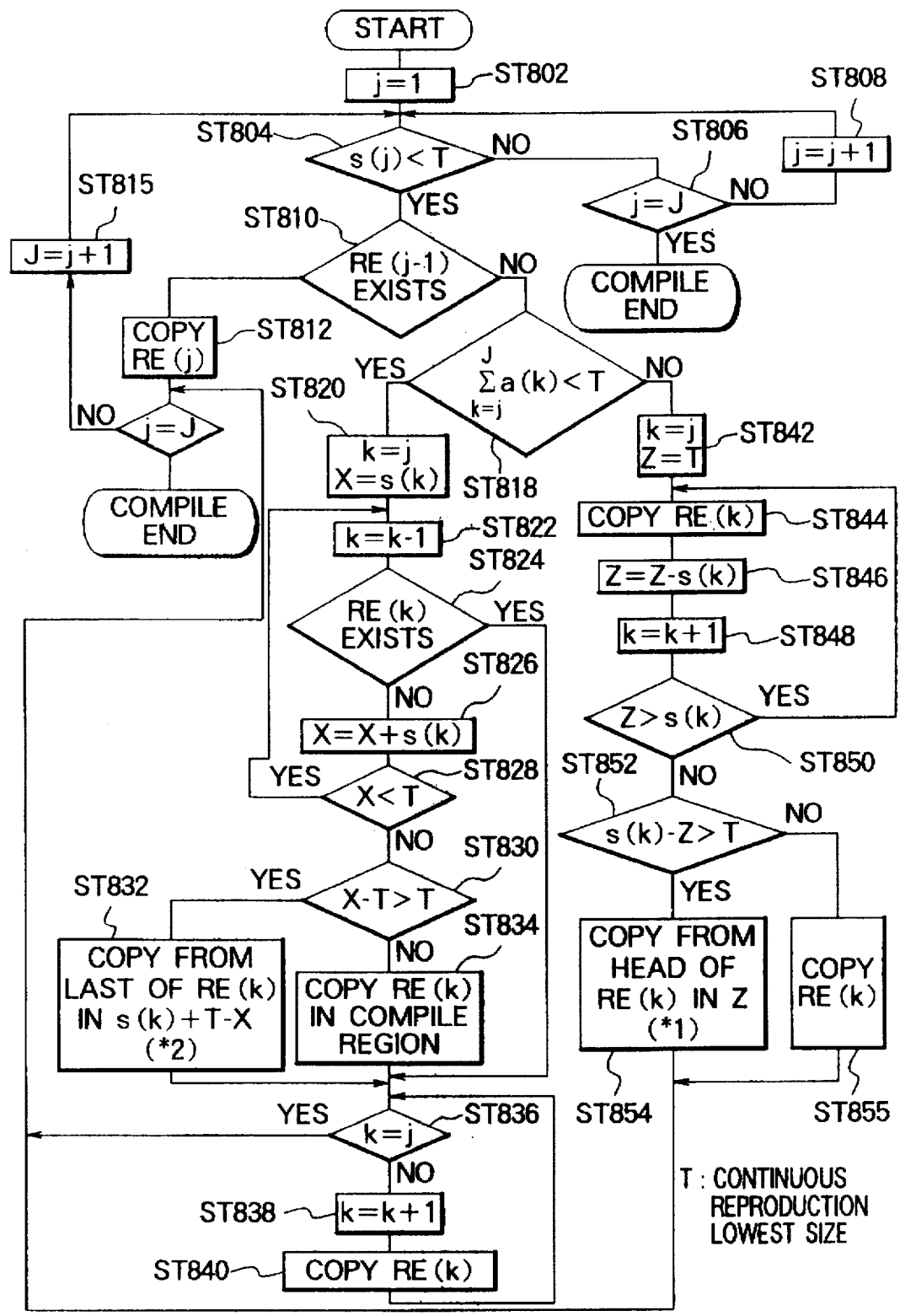
FIG. 33 is a flow chart of a compile processing carried out by the data managing device of the audio and/or video data recording and reproduction apparatus in the sixth embodiment in further detail.

FIG. 33 is a flow chart showing the content of the compile processing carried out by the data managing device 34 of the audio and/or video data recording and reproduction apparatus 3 in the sixth embodiment in further detail.

As shown in FIG. 31 and FIG. 32, at step 702 (ST702), the audio and/or video apparatus $4_i$ outputs the command (VFL_DOWNLOAD command) containing the editing data and making the input/output control device $38_i$ receive the editing data to the input/output control device $38_i$. The input/output control device $38_i$ receives this VFL_DOWNLOAD command.

At step 704 (ST704), the input/output control device $38_i$ outputs the received VFL_DOWNLOAD command to the data managing device 34.

At step 706 (ST706) and step 708 (ST708), the data managing device 34 searches for the file entry (FE) and the record entry (RE) of the raw data containing the partial data contained in the edited data based on the editing data and generates the reproduction entry (FIG. 17C). Further, the data managing device 34 increments the delete enable flag of the record entry found as the result of the search to make the value of the delete enable flag OFF.

At step 710 (ST710), the input/output control device $38_i$ analyzes the reproduction entry sent from the data managing device 34 and searches for partial data having a short data length and unable to be continuously reproduced.

At step 712 (ST712), the input/output control device $38_i$ decides the necessity of the compile processing. The content of the processing regarding the decision of the necessity of the compile processing by the input/output control device $38_i$ is as shown in FIG. 23. Only in a case where the compile processing is necessary does the operation routine proceed to the processing of ST714. Note that, the processing content of ST750 is the same as the processing content of ST450 shown in FIG. 21 and FIG. 23.

At step 714 (ST714), the data managing device 34 secures the recording region which becomes necessary for the compile processing (compile recording region).

At step 716 (ST716), the data managing device 34 carries out the compile processing (FIG. 20A to FIG. 20D). Note that, a detailed description of the content of the compile processing by the input/output control device $38_i$ is given in FIG. 33.

Note that, in the flow chart shown in FIG. 33, the data b(k) and s(j) in the reproduction entry R(k) is defined as shown in FIG. 25, and the variables Z and s(k) are defined as shown in FIG. 26A and FIG. 26B.

That is, the variable Z in ST854 in FIG. 33 indicates the data length of the data removed from the partial data immediately before the short partial data for obtaining the data having the data length T or more in addition to the short partial data (FIG. 20B) as shown in FIG. 26A.

Further, the numerical value s(k)–T–X at ST832 in FIG. 27 indicates the data length of the data removed from the partial data immediately after the short partial data so as to obtain the data having the data length T or more in addition to the short partial data as shown in FIG. 26B.

As explained above, when the generation of the reproduction entry and the compile processing are carried out in the data managing device 34, the amount of the data transmitted and received on the main CPU bus 32 may be made smaller and the possibility of occurrence of the bus bottleneck is reduced.

Note that, the generation of the reproduction entry and the compile processing shown in the fifth embodiment and the sixth embodiment can realize the same function, therefore either of them which can optimize the performance of the audio and/or video data recording and reproduction apparatus 3 can be selected in accordance with the configuration of the audio and/or video data recording and reproduction apparatus 3 (number of the audio and/or video apparatuses 4, connected, etc.).

By the audio and/or video data recording and reproduction apparatus explained above, it is possible to record a plurality of series of audio and/or video data to be edited in a randomly accessible recording medium such as a hard disc or magnetic optical disc (MO disc), reproduce any audio and/or video data in accordance with the request of an external apparatus such as an editing apparatus, and provide the same.

Further, the audio and/or video data recording and reproduction apparatus explained above is suited for editing of audio and/or video data spanning a long period of time.

Further, by the audio and/or video data recording and reproduction apparatus explained above, it is possible to reproduce audio and/or video data having exactly the same content as that of the audio and/or video data of the result of editing (edited data) without recording the audio and/or video data having the same content in the recording medium in an overlapping manner.

Further, by the audio and/or video data recording and reproduction apparatus explained above, the load of processing regarded as indispensable in the audio and/or video data recording and reproduction apparatus such as the management of the recording regions (occupied recording regions) occupied by the audio and/or video data in the recording medium and the empty recording regions, processing regarding the input/output control signals input from external audio and/or video apparatuses, and the protocol control regarding the input/output of the audio and/or video data with the audio and/or video apparatuses can be dispersed to different component parts.

Further, by the audio and/or video data recording and reproduction apparatus explained above, it is possible to prevent the processing load from being concentrated at a specific component part and possible to input and output the audio and/or video data at a high speed with a larger number of outside audio and/or video apparatuses.

Further, in the audio and/or video data recording and reproduction apparatus explained above, the bus for transmitting and receiving the audio and/or video data and the bus for transmitting and receiving the other control data are separate, so bus bottlenecks seldom occur.

What is claimed is:

1. An information data recording and reproduction apparatus comprising:

a recording and reproducing means for recording and reproducing information data with respect to a designated recording region of a randomly accessible recording medium;

a recording region managing means for managing occupied recording regions occupied by said recorded information data in said recording medium and empty recording regions of said recording medium; and a plurality of input/output control means respectively bus-connected to said recording region managing means via a first bus for receiving data indicating said occupied recording regions and said empty recording regions via said first bus and respectively bus-connected to said recording and reproducing means via a second bus for inputting and outputting said information data via the second bus, each of said plurality of input/output control means designates regions of said recording medium to record said information data and regions of said recording medium recording the information data to reproduce to said recording and reproducing means based on said data indicating said occupied recording regions and said empty recording regions received from said record region managing means.

2. An information data recording and reproduction apparatus as set forth in claim 1, wherein said recording region managing means comprises an occupied recording region list generating means for generating an occupied recording region list of a linked list format linking each to each of a plurality of said occupied recording regions of said information data recorded in said recording medium by said recording and reproducing means, an identification flag adding means for adding an identification flag taking a first value to said occupied recording region list where the information data corresponding to said occupied recording region list can be deleted, a recording region releasing means for releasing the occupied recording regions requested to be released and deleting said released occupied recording regions from said occupied recording region list only in a case where the value of said identification flag is said first value when receiving said request for releasing said occupied recording regions, and an empty recording region list generating means for generating an empty recording region list of a linked list format linking each to each of a plurality of said empty recording regions of said recording and reproducing means.

3. An information data recording and reproduction apparatus as set forth in claim 1, wherein said information data are audio and/or video data.

4. An information data recording and reproduction apparatus comprising:

a recording and reproducing means for recording and reproducing information data with respect to a designated recording region of a randomly accessible recording medium;

a first recording region managing means for managing first occupied recording regions occupied by the recorded information data in the recording medium and empty recording regions of the recording medium;

a second recording region managing means for managing second occupied recording regions occupied by part or all of the information data as partial data to be reproduced in combination in the recording medium; and a plurality of input/output control means respectively bus-connected to said first recording region managing means and said second recording region managing means via a first bus for receiving the data indicating said first occupied recording regions, the data indicating said second occupied recording regions, and said empty recording regions via said first bus and respectively bus-connected to said recording and reproducing means via a second bus for inputting and outputting the information data via said second bus, each of said plurality of input/output control means has a recording and reproducing control means for designating regions of said recording medium to record said information data to said recording and reproducing means based on the data indicating said empty recording regions of said recording medium receiving from said first recording region managing means and designating regions of said recording medium recording said information data to be reproduced to said recording and reproducing means based on the data indicating said first occupied recording regions and said second occupied recording regions received from said first recording region managing means and said second recording region managing means.

5. An information data recording and reproduction apparatus as set forth in claim 4, wherein said first recording region managing means comprises a first occupied recording region list generating means for generating a first occupied recording region list of a linked list format linking each to each of a plurality of said first occupied recording regions of said information data recorded in said recording medium by said recording and reproducing means, a first identification flag adding means for adding an identification flag taking a first value to said first occupied recording region list where the information data corresponding to said first occupied recording region list can be deleted, and an empty recording region list generating means for generating an empty recording region list of a linked list format linking each to each of a plurality of said empty recording regions of said recording and reproducing means, and wherein said second recording regions managing means comprises a second occupied recording region list generating means for generating a second occupied recording region list of a linked list format linking each to each of said second occupied recording regions of said partial data to be reproduced in combination and a second identification flag adding means for adding an identification flag taking a second value to said second occupied recording region list where the information data corresponding to said second occupied recording region list cannot be deleted.

6. An information data recording and reproduction apparatus as set forth in claim 5, further comprising:

a recording region releasing means for releasing said first occupied recording regions or said second occupied recording regions requested to be released and deleting said released first occupied recording regions or said released second occupied recording regions from said first occupied recording region list or said second occupied recording region list only in a case where the value of said identification flag is said first value when receiving said request for releasing said first occupied recording regions or said second occupied recording regions, and an empty recording region list generating means for generating an empty recording region list of a linked list format linking each to each of a plurality of said empty recording regions of said recording and reproducing means.

7. An information data recording and reproduction apparatus as set forth in claim 5, further comprising;

a partial data recording means for continuously recording short partial data having a data length not more than a predetermined data length and a predetermined part of the partial data reproduced before or after the short partial data in the predetermined recording region of the recording medium where the partial data has a data length not more than the predetermined data length, and a third recording region managing means for managing third occupied recording regions indicating recording regions occupied by the partial data, the predetermined part of the unit data recorded in the predetermined recording region of the recording region, and the short partial data in the recording medium based on the first occupied recording regions, and wherein said recording and reproduction control means designates said first occupied recording regions, said second occupied recording regions, and said third occupied recording regions of the information data to be reproduced to said recording and reproducing means.

8. An information data recording and reproduction apparatus as set forth in claim 7, wherein said information data are audio and/or video data.

* * * * *